(12) United States Patent
Fukunaga et al.

(10) Patent No.: US 11,207,990 B2
(45) Date of Patent: Dec. 28, 2021

(54) WIRELESS POWER TRANSMISSION DEVICE AND WIRELESS POWER TRANSMISSION SYSTEM

(71) Applicant: TDK CORPORATION, Tokyo (JP)

(72) Inventors: Kazutoyo Fukunaga, Tokyo (JP); Yoichi Kyono, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/039,197

(22) Filed: Sep. 30, 2020

(65) Prior Publication Data

US 2021/0107366 A1 Apr. 15, 2021

(30) Foreign Application Priority Data

Oct. 9, 2019 (JP) .............................. JP2019-186253

(51) Int. Cl.
| | |
|---|---|
| *H02J 50/80* | (2016.01) |
| *B60L 53/12* | (2019.01) |
| *H02J 50/12* | (2016.01) |
| *B60L 53/30* | (2019.01) |
| *H02J 7/04* | (2006.01) |
| *H02J 7/00* | (2006.01) |
| *H02J 50/90* | (2016.01) |

(52) U.S. Cl.
CPC ............. *B60L 53/12* (2019.02); *B60L 53/305* (2019.02); *H02J 7/00045* (2020.01); *H02J 7/04* (2013.01); *H02J 50/12* (2016.02); *H02J 50/80* (2016.02); *H02J 50/90* (2016.02)

(58) Field of Classification Search
None
See application file for complete search history.

(56) References Cited

U.S. PATENT DOCUMENTS

| | | | |
|---|---|---|---|
| 2011/0266880 A1* | 11/2011 | Kim ....................... | H02J 50/12 307/104 |
| 2014/0210277 A1* | 7/2014 | Ben-Shalom ........... | H02J 50/10 307/104 |
| 2016/0164306 A1 | 6/2016 | Tachiwa | |

FOREIGN PATENT DOCUMENTS

| | | |
|---|---|---|
| JP | 2011-152008 A | 8/2011 |
| JP | 2015-027156 A | 2/2015 |
| JP | 2016-111879 A | 6/2016 |

* cited by examiner

*Primary Examiner* — Daniel Kessie
(74) *Attorney, Agent, or Firm* — Oliff PLC

(57) ABSTRACT

A wireless power transmission device that enables wireless power receiving device to identify wireless communication circuit without using communication of the wireless communication circuit of wireless power transmission device. A wireless power transmission device for wirelessly transmitting power to a wireless power receiving device includes a power transmission coil, a power transmission circuit configured to supply alternating current (AC) power to the power transmission coil, and a power transmission side communication circuit configured to communicate with the wireless power receiving device. The power transmission circuit is configured to supply a first AC power to the power transmission coil. The first AC power is an AC power having an intermittent supply period in an intermittent pattern representing identification information of the power transmission side communication circuit. The power transmission coil is configured to receive the first AC power and generate a first AC magnetic field corresponding to the intermittent pattern.

15 Claims, 10 Drawing Sheets

WIRELESS POWER TRANSMISSION DEVICE AND WIRELESS POWER TRANSMISSION SYSTEM

BACKGROUND OF THE INVENTION

Field of the Invention

The present disclosure relates to a wireless power transmission device and a wireless power transmission system.

Priority is claimed on Japanese Patent Application No. 2019-186253, filed Oct. 9, 2019, the content of which is incorporated herein by reference.

Description of Related Art

In wireless power transmission technology, power is transmitted from a power transmission side (input side) device located at a position physically distant from a power receiving side (output side) device to the power receiving side device. Thus, a photocoupler or the like cannot be used for feedback for power control and, for example, power control is performed through wireless communication between a power transmission side device and a power receiving side device.

For example, when a plurality of power transmission side devices are disposed nearby, a power receiving side device is required to establish wireless communication with a specific power transmission side device. Thus, a power receiving side device is required to designate a power transmission side device serving as a connection destination by performing individual allocation of identification information on the wireless communication network (hereinafter referred to as network identification information for convenience of description) to each power transmission side device and the like. Setting, a change, and the like of such network identification information are performed by a user's operation.

In Patent Document 1, a contactless charging system, which includes a charging device mounted on a vehicle and a charging stand having a power feeding device, is disclosed (see Patent Document 1).

In this contactless charging system, the charging device transmits identification information to the power feeding device through wireless communication. The power feeding device generates a pattern of power to be supplied to a power feeding coil to generate power for collation based on the identification information. The pattern enables information based on the identification information to be detected. The charging device identifies a power feeding device that should perform wireless communication with the charging device from among one or more power feeding devices by performing collation of the identification information based on the power for collation. Thereby, wireless communication is established between the power feeding device and the charging device.

PATENT DOCUMENTS

[Patent Document 1] Japanese Unexamined Patent Application, First Publication No. 2015-27156

SUMMARY OF THE INVENTION

Also, in the technology described in Patent Document 1, the identification information is transmitted from the charging device to the power feeding device through wireless communication, the power feeding device generates the pattern of power to be supplied to the power feeding coil to cause the power for collation to be generated based on the identification information, and the charging device performs the collation of the identification information based on the power for collation. In this manner, in the technology disclosed in Patent Document 1, it is not possible to identify the power feeding device without using wireless communication because the identification information can be transmitted from the charging device (a power receiving side device) through wireless communication when wireless communication is established.

The present disclosure has been made in view of such circumstances and an objective of the present disclosure is to provide a wireless power transmission device and a wireless power transmission system capable of enabling a wireless power receiving device to identify a wireless communication circuit without using communication of the wireless communication circuit of a wireless power transmission device.

According to an aspect of the present disclosure, a wireless power transmission device for wirelessly transmitting power to a wireless power receiving device is provided, the wireless power transmission device including: a power transmission coil; a power transmission circuit configured to supply alternating current (AC) power to the power transmission coil; and a power transmission side communication circuit configured to communicate with the wireless power receiving device, wherein the power transmission circuit is configured to supply a first AC power to the power transmission coil, wherein the first AC power is an AC power having an intermittent supply period in an intermittent pattern representing identification information of the power transmission side communication circuit, and wherein the power transmission coil is configured to receive the first AC power and generate a first AC magnetic field corresponding to the intermittent pattern.

According to another aspect of the present disclosure, a wireless power transmission system is provided including: the wireless power transmission device; and the wireless power receiving device, wherein the wireless power receiving device includes a power receiving coil; a power receiving circuit configured to convert the AC power received by the power receiving coil and supply the converted AC power to a load; and a power receiving side communication circuit configured to communicate with the power transmission side communication circuit and wherein the power receiving side communication circuit starts an authentication process with the power transmission side communication circuit based on the identification information detected from the first AC power received by the power receiving coil via the first AC magnetic field.

The wireless power transmission device and the wireless power transmission system according to the present disclosure can enable a wireless power receiving device to identify a wireless communication circuit without using communication of the wireless communication circuit of a wireless power transmission device.

DETAILED DESCRIPTION OF THE INVENTION

Hereinafter, embodiments of the present disclosure will be described with reference to the drawings.

Also, in the following embodiments, when the three physical quantities of voltage, current, and power are able to be interchanged as targets for detection and the like, replacement components may be used.

Also, although an example of a circuit configuration is shown in the following embodiments, a plurality of circuits may be used instead of one circuit when functions integrated in one circuit can be distributed to a plurality of circuits. In contrast, when functions of a plurality of circuits can be integrated as one circuit, one circuit may be used instead of a plurality of circuits.

First Embodiment

<Wireless Power Transmission System>

Figure 1:
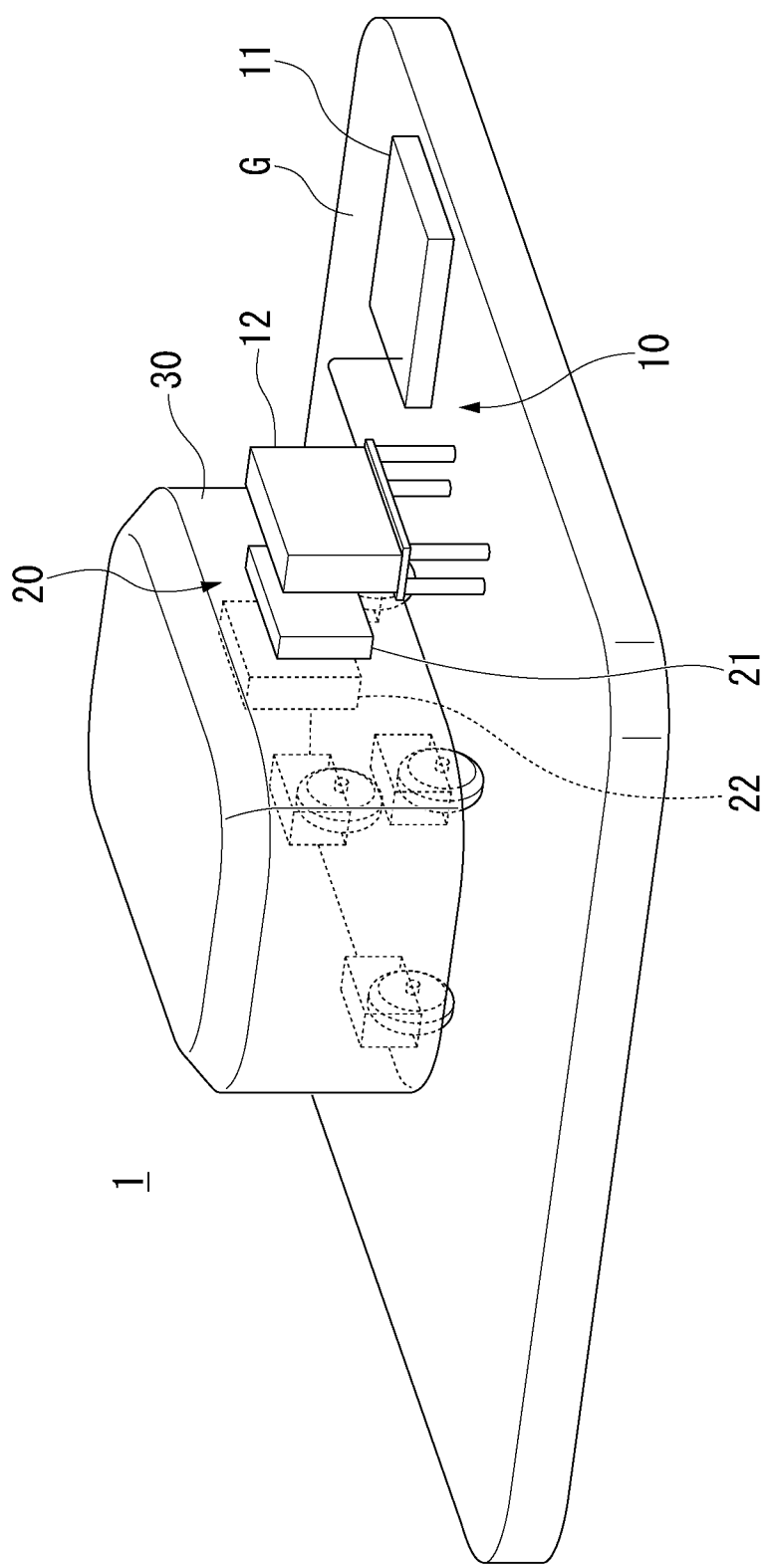
FIG. 1 is a diagram showing a schematic exterior of a wireless power transmission system according to an embodiment of the present disclosure.

FIG. 1 is a diagram showing a schematic exterior of a wireless power transmission system 1 according to an embodiment of the present disclosure.

The wireless power transmission system 1 includes a wireless power transmission device 10 and a wireless power receiving device 20.

In the present embodiment, the wireless power receiving device 20 is provided in a moving object 30. The moving object 30 travels on the ground G. Here, the moving object 30 is, for example, an automated guided vehicle (AGV).

Also, in the present embodiment, the wireless power transmission device 10 is provided on the ground G in a charging station. The charging station is used as a place for charging a battery of the moving object 30.

The wireless power transmission device 10 includes a power transmission unit 11 and a power transmission coil unit 12. The power transmission unit 11 and the power transmission coil unit 12 are connected.

The wireless power receiving device 20 includes a power receiving coil unit 21 and a power receiving unit 22. The power receiving coil unit 21 and the power receiving unit 22 are connected.

Figure 2:
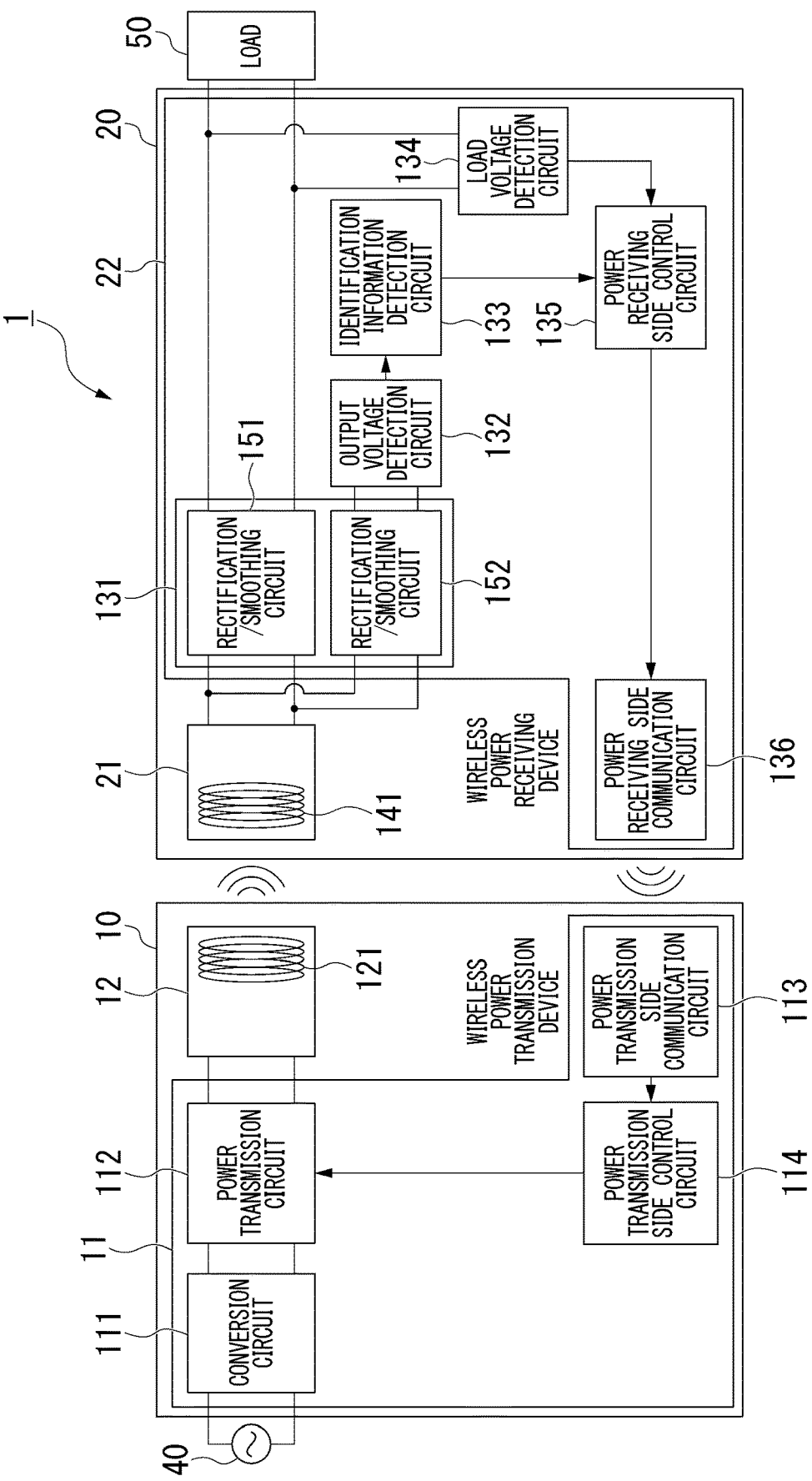
FIG. 2 is a diagram showing functional blocks of the wireless power transmission system according to the embodiment of the present disclosure (a first embodiment).

FIG. 2 is a diagram showing functional blocks of the wireless power transmission system 1 according to the embodiment of the present disclosure (a first embodiment).

The wireless power transmission system 1 includes the wireless power transmission device 10 and the wireless power receiving device 20.

Also, an AC source 40 that supplies power to the wireless power transmission device 10 and a load 50 that is connected to the wireless power receiving device 20 are shown in FIG. 2. In the example of FIG. 2, the load 50 is a battery mounted on the moving object 30.

Also, one or both of the AC source 40 and the load 50 may be regarded as being included in the wireless power transmission system 1.

Here, the load 50 is, for example, a resistance load whose equivalent resistance value changes with time according to a demand state (a storage state or a consumption state) of power.

Also, the moving object 30 may be another device that is electrically controlled instead of the AGV.

Also, the wireless power receiving device 20 may be configured to be connected to a motor mounted on the moving object 30 instead of the battery of the moving object 30 or may be configured to be connected to another load.

Also, the wireless power receiving device 20 may also be regarded as including the load 50. Also, for example, the wireless power receiving device 20 may be configured to be connected to the load 50 via a charging circuit.

The wireless power transmission device 10 will be described.

The power transmission unit 11 includes a conversion circuit 111, a power transmission circuit 112, a power transmission side communication circuit 113, and a power transmission side control circuit 114.

The conversion circuit 111 is connected to an external AC source 40 that supplies an AC voltage to the conversion circuit 111. The AC source 40 may be, for example, a commercial power supply, or may be another power supply.

The power transmission coil unit 12 includes a power transmission coil 121 that is a coil that functions as an antenna for wireless power transmission.

The conversion circuit 111 is connected to the AC source 40 and converts the AC voltage input from the AC source 40 into a DC voltage having a desired voltage value. The conversion circuit 111 supplies the DC voltage obtained through the conversion to the power transmission circuit 112.

The power transmission circuit 112 converts the DC voltage supplied from the conversion circuit 111 into an AC voltage having a drive frequency and supplies the AC voltage having the drive frequency obtained through the conversion to the power transmission coil unit 12.

The power transmission coil unit 12 causes the power transmission coil 121 to generate an AC magnetic field in accordance with the AC voltage supplied from the power transmission circuit 112. Thereby, the power transmission coil unit 12 transmits power to the wireless power receiving device 20 through wireless power transmission via the power transmission coil 121.

Also, the power transmission coil unit 12 may include a capacitor as a circuit element constituting a power transmission side resonance circuit together with the power transmission coil 121 in the power transmission coil unit 12.

In the present embodiment, the AC voltage supplied from the power transmission circuit 112 to the power transmission coil unit 12 may include identification information of the power transmission side communication circuit 113.

In the present embodiment, at least the identification information of the wireless communication circuit regarding the power transmission side communication circuit 113 (hereinafter referred to as communication circuit identification information for convenience of description) is used as the identification information of the power transmission side communication circuit 113. The communication circuit identification information is identification information unique to each power transmission side communication circuit 113 and a different power transmission side communication circuits 113 has different communication circuit identification information.

Also, the network identification information is assigned to the power transmission side communication circuit 113. The same network identification information may be assigned to different power transmission side communication circuits 113 and the network identification information can be changed by the user.

In the present embodiment, the power transmission side communication circuit 113 is identified by the communication circuit identification information. Thus, even if the network identification information of the different power transmission side communication circuits 113 is the same, these different power transmission side communication circuits 113 are identified by the communication circuit identification information.

The power transmission side communication circuit 113 performs wireless communication with the wireless power receiving device 20.

The power transmission side communication circuit 113 receives a signal wirelessly transmitted from the wireless power receiving device 20. The power transmission side communication circuit 113 outputs information of the received signal to the power transmission side control circuit 114. In the present embodiment, the signal is a feedback signal from the wireless power receiving device 20 to the wireless power transmission device 10.

The power transmission side control circuit 114 executes various types of control and processes in the wireless power transmission device 10.

For example, the power transmission side control circuit 114 controls one or more of a drive frequency and a level of power transmission in the power transmission circuit 112. As an example, the power transmission side control circuit 114 controls the drive frequency in the power transmission circuit 112 based on information input from the power transmission side communication circuit 113.

Also, the power transmission side control circuit 114 performs control such that the AC voltage supplied from the power transmission circuit 112 to the power transmission coil unit 12 includes the identification information of the power transmission side communication circuit 113.

The wireless power receiving device 20 will be described.

The power receiving unit 22 includes a power receiving circuit 131, an output voltage detection circuit 132, an identification information detection circuit 133, a load voltage detection circuit 134, a power receiving side control circuit 135, and a power receiving side communication circuit 136.

The power receiving circuit 131 includes two rectification/smoothing circuits 151 and 152.

The rectification/smoothing circuit 151 and the load voltage detection circuit 134 are connected to the load 50.

The power receiving coil unit 21 includes a power receiving coil 141 that is a coil that functions as an antenna for wireless power transmission.

In the power receiving coil 141 of the power receiving coil unit 21, an AC voltage is generated by an AC magnetic field generated by the power transmission coil 121 of the power transmission coil unit 12. Thereby, the power receiving coil unit 21 receives power from the wireless power transmission device 10 through wireless power transmission via the power receiving coil 141. The power receiving coil unit 21 outputs an AC voltage according to the received power to each of the two rectification/smoothing circuits 151 and 152. Also, the power receiving coil unit 21 may include a capacitor as a circuit element constituting a power receiving side resonance circuit together with the power receiving coil 141.

Each of the two rectification/smoothing circuits 151 and 152 rectifies the AC voltage supplied from the power receiving coil unit 21, smooths the rectified AC voltage, and converts the AC voltage into a DC voltage.

The rectification/smoothing circuit 151 supplies the DC voltage obtained through the conversion to the load 50 and the load voltage detection circuit 134.

The rectification/smoothing circuit 152 supplies the DC voltage obtained through the conversion to the output voltage detection circuit 132. Also, one or both of the two rectification/smoothing circuits 151 and 152 may separately include, for example, a rectification circuit that performs rectification and a smoothing circuit that performs smoothing.

The output voltage detection circuit 132 detects the DC voltage supplied from the rectification/smoothing circuit 152 as an output voltage. The output voltage detection circuit 132 outputs the detected output voltage to the identification information detection circuit 133. Also, a detection circuit that detects a current or power corresponding to the output voltage may be used instead of the output voltage detection circuit 132 and it is only necessary to acquire the identification information based on a detection result.

The identification information detection circuit 133 detects the identification information of the power transmission side communication circuit 113 based on the output voltage input from the output voltage detection circuit 132. The identification information detection circuit 133 outputs the detected identification information of the power transmission side communication circuit 113 to the power receiving side control circuit 135.

The load voltage detection circuit 134 detects the voltage supplied from the rectification/smoothing circuit 151 to the load 50 as a load voltage. The load voltage detection circuit 134 outputs the detected load voltage to the power receiving side control circuit 135. Also, a detection circuit that detects a current or power corresponding to the load voltage may be used instead of the load voltage detection circuit 134.

The power receiving side control circuit 135 executes various types of control and processes in the wireless power receiving device 20.

For example, the power receiving side control circuit 135 controls the power receiving side communication circuit 136 based on the identification information of the power transmission side communication circuit 113 input from the identification information detection circuit 133. For example, the power receiving side control circuit 135 requests wireless communication authentication using the identification information of the power transmission side communication circuit 113 through the power receiving side communication circuit 136.

Although a combination of communication circuit identification information and network identification information is used as the identification information of the power transmission side communication circuit 113 serving as an authentication request destination in the wireless communication authentication request in the present embodiment, only the communication circuit identification information may be used as another example.

Also, the power receiving side control circuit 135 controls the power receiving side communication circuit 136 based on the load voltage input from the load voltage detection circuit 134. For example, the power receiving side control circuit 135 performs control so that the power receiving side communication circuit 136 transmits a feedback signal from the wireless power receiving device 20 to the wireless power transmission device 10. In the present embodiment, wireless communication from the power receiving side communication circuit 136 to the power transmission side communication circuit 113 is used as a feedback system for wireless power transmission from the power transmission coil unit 12 to the power receiving coil unit 21.

In the present embodiment, the power receiving side control circuit 135 performs feedback control on the wireless power transmission device 10 so that the power received by the wireless power receiving device 20 (the load voltage in the present embodiment) becomes constant.

Here, any scheme is used as a scheme of wireless communication performed between the power transmission side communication circuit 113 and the power receiving side communication circuit 136.

Also, one or both of the power transmission coil unit 12 and the power receiving coil unit 21 may include a magnetic body that enhances magnetic coupling between the power transmission coil 121 and the power receiving coil 141, an electromagnetic shield that curbs external leakage of a magnetic field generated by the power transmission coil 121 or the power receiving coil 141, or the like. The electromagnetic shield may be, for example, a metal plate.

In the present embodiment, the power transmission coil unit 12 and the power transmission unit 11 are installed on the ground G1. Also, the power receiving coil unit 21 and the power receiving unit 22 are installed on a side surface of the moving object 30. When the moving object 30 is located at a predetermined position near the power transmission coil unit 12, the power transmission coil 121 of the power transmission coil unit 12 is configured to face the side surface of the moving object 30 and face the power receiving coil 141 of the power receiving coil unit 21.

Also, although the power transmission unit 11 and the power transmission coil unit 12 are separate in the present embodiment, the power transmission unit 11 and the power transmission coil unit 12 may be integrally configured.

Also, although the power receiving coil unit 21 and the power receiving unit 22 are separate in the present embodiment, the power receiving coil unit 21 and the power receiving unit 22 may be integrally configured.

<Schematic Processing Sequence in Wireless Power Transmission System>

Figure 3:
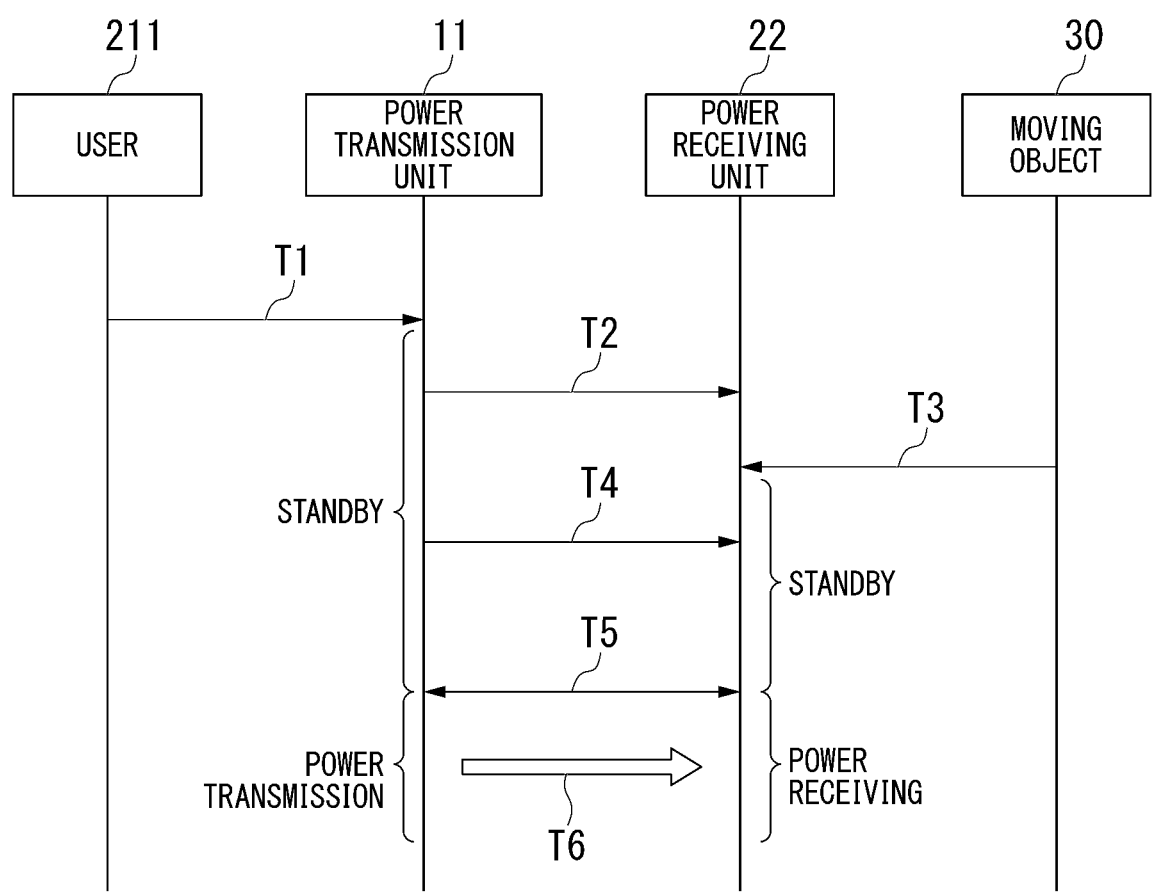
FIG. 3 is a diagram showing a schematic sequence of a process performed in the wireless power transmission system according to the embodiment of the present disclosure.

FIG. 3 is a diagram showing a schematic sequence of a process performed in the wireless power transmission system 1 according to the embodiment of the present disclosure.

A sequence of a process performed by a user 211 who operates the wireless power transmission device 10, the power transmission unit 11 of the wireless power transmission device 10, the power receiving unit 22 of the wireless power receiving device 20, and the moving object 30 on which the wireless power receiving device 20 is mounted is shown in FIG. 3.

(Processing T1)

The user 211 performs an operation to switch a power supply of the wireless power transmission device 10 from OFF to ON. The operation may be, for example, pressing of a predetermined button or the like.

The wireless power transmission device 10 is activated when the power supply is switched from OFF to ON. The wireless power transmission device 10 is brought into a standby state.

(Processing T2)

The power transmission unit 11 starts transmission of identification information of the power transmission side communication circuit 113 using wireless power transmission when a predetermined condition has been satisfied. In the present embodiment, a combination of communication circuit identification information of the power transmission side communication circuit 113 and network identification information is used as the identification information. Also, the identification information may include other information. Also, for example, the identification information may include the communication circuit identification information without including the network identification information.

Also, in the present embodiment, the power transmission unit 11 transmits the identification information according to an intermittent pattern.

(Processing T3)

In the present sequence, it is assumed that the transmission of the identification information from the power transmission unit 11 has been started before the wireless power receiving device 20 is activated.

The moving object 30 switches the power supply of the wireless power receiving device 20 from OFF to ON, for example, in accordance with a predetermined operation performed by an operator of the moving object 30. The operation may be, for example, pressing of a predetermined button or the like.

The wireless power receiving device 20 is activated when the power supply is switched from OFF to ON. The wireless power receiving device 20 is brought into a standby state.

(Processing T4)

The power transmission unit 11 transmits identification information, for example, at a predetermined cycle.

Also, although the transmission of the identification information is shown twice in (Processing T2) and (Processing T4) for convenience of description in the example of FIG. 3, the power transmission unit 11 may transmit the identification information three or more times, for example, when there is no response from the power receiving unit 22.

(Processing T5)

In a state in which the moving object 30 has entered the charging station and the power receiving unit 22 has been activated, the power receiving unit 22 receives power transmitted through wireless power transmission from the power transmission unit 11 via the power receiving coil unit 21. The power receiving unit 22 detects identification information based on the received power.

The power receiving unit 22 uses the detected identification information to transmit an authentication request for establishing wireless communication from the power receiving side communication circuit 136 to the power transmission side communication circuit 113. For example, the power receiving side communication circuit 136 designates the identification information when the authentication request for establishing wireless communication has been transmitted to the power transmission side communication circuit 113.

Thereby, wireless communication is established between the power transmission side communication circuit 113 having the designated identification information and the power receiving side communication circuit 136 that has requested the authentication.

In the present embodiment, the power receiving side control circuit 135 automatically causes an authentication request for establishing wireless communication to be transmitted from the power receiving side communication circuit 136 to the power transmission side communication circuit 113 when the identification information of the power transmission side communication circuit 113 has been received.

(Processing T6)

When wireless communication is established between the power transmission side communication circuit 113 and the power receiving side communication circuit 136, power feeding from the power transmission unit 11 to the power receiving unit 22 is started. When the power feeding to the power receiving unit 22 has been completed, the power feeding is ended.

Here, in the present embodiment, (processing T2), (processing T4), (processing T5), and (processing T6) are automatedly performed by the wireless power transmission device 10 and the wireless power receiving device 20.

Also, in the present embodiment, for convenience of description, the power feeding after the wireless communication is established between the power transmission side communication circuit 113 and the power receiving side communication circuit 136 is also referred to as main power feeding.

In the main power feeding, the wireless power transmission device 10 is in a power transmission state and the wireless power receiving device 20 is in a power receiving state.

Here, any condition may be used as a predetermined condition that becomes a trigger for starting the transmission of the identification information by the wireless power transmission device 10.

As an example, the predetermined condition may be a condition that the wireless power transmission device 10 has been activated. In this case, the wireless power transmission device 10 starts the transmission of the identification information when activated.

As another example, the predetermined condition may be a condition that the wireless power transmission device 10 has detected a physical object which has approached the wireless power transmission device 10. In this case, the wireless power transmission device 10 starts the transmission of the identification information when a physical object which has approached the wireless power transmission device 10 has been detected.

<Process Performed by the Wireless Power Transmission Device>

Figure 4:
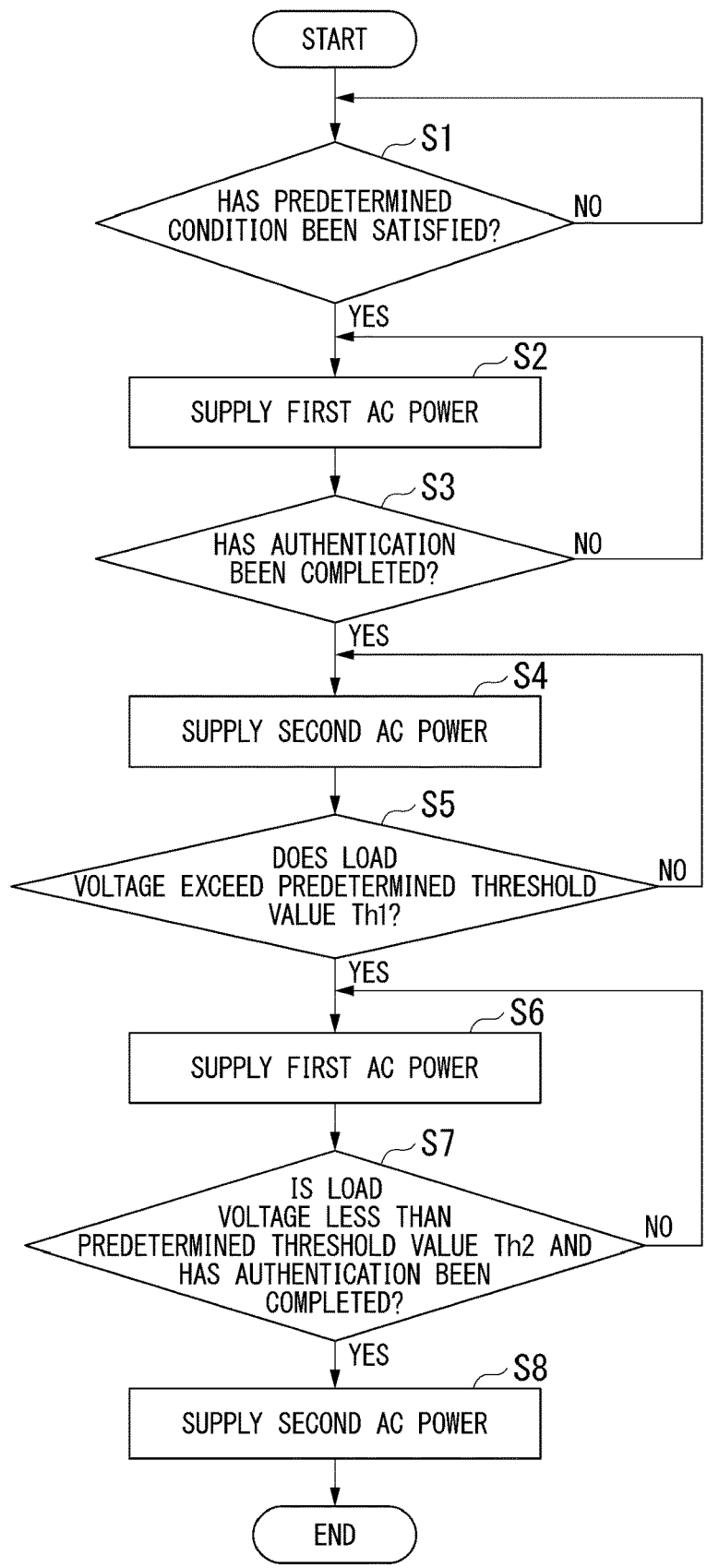
FIG. 4 is a diagram showing an example of a processing procedure performed in a wireless power transmission device according to the embodiment of the present disclosure.

FIG. 4 is a diagram showing an example of a processing procedure performed in the wireless power transmission device 10 according to the embodiment of the present disclosure.

In the present embodiment, the power transmission side control circuit 114 executes the process of the present flow.

In the present embodiment, the wireless power transmission device 10 transmits the identification information using the first AC power and transmits the power using the second AC power. In the present embodiment, for convenience of description, a magnetic field generated by the first AC power is also referred to as a first AC magnetic field and a magnetic field generated by the second AC power is also referred to as a second AC magnetic field.

Here, the first AC power is less than the second AC power. For example, each of a level of the first AC power and a level of the second AC power is preset.

(Step S1)

In the wireless power transmission device 10, when the power transmission side control circuit 114 determines that the predetermined condition, which becomes a trigger for starting the transmission of the identification information, has been satisfied (step S1: YES), the process proceeds to the processing of step S2.

On the other hand, in the other case (step S1: NO), the process returns to the processing of step S1.

(Step S2)

The power transmission side control circuit 114 controls the power transmission circuit 112 so that the first AC power is supplied from the power transmission circuit 112 to the power transmission coil unit 12. In the present embodiment, the first AC power is used to intermittently transmit the intermittent pattern representing the identification information through the first AC magnetic field from the first AC power. Then, the process proceeds to the processing of step S3. The intermittent pattern will be described with reference to FIG. 6.

(Step S3)

The power transmission side control circuit 114 determines whether or not the authentication of the wireless communication between the power transmission side communication circuit 113 and the power receiving side communication circuit 136 has been completed according to a request from the power receiving side communication circuit 136 of the wireless power receiving device 20.

Regarding a result of this determination, when the power transmission side control circuit 114 determines that the authentication of the wireless communication has been completed (step S3: YES), the process proceeds to the processing of step S4.

On the other hand, regarding a result of this determination, when the power transmission side control circuit 114 determines that the authentication of the wireless communication has not been completed (step S3: NO), the process proceeds to the processing of step S2.

Figure 5:
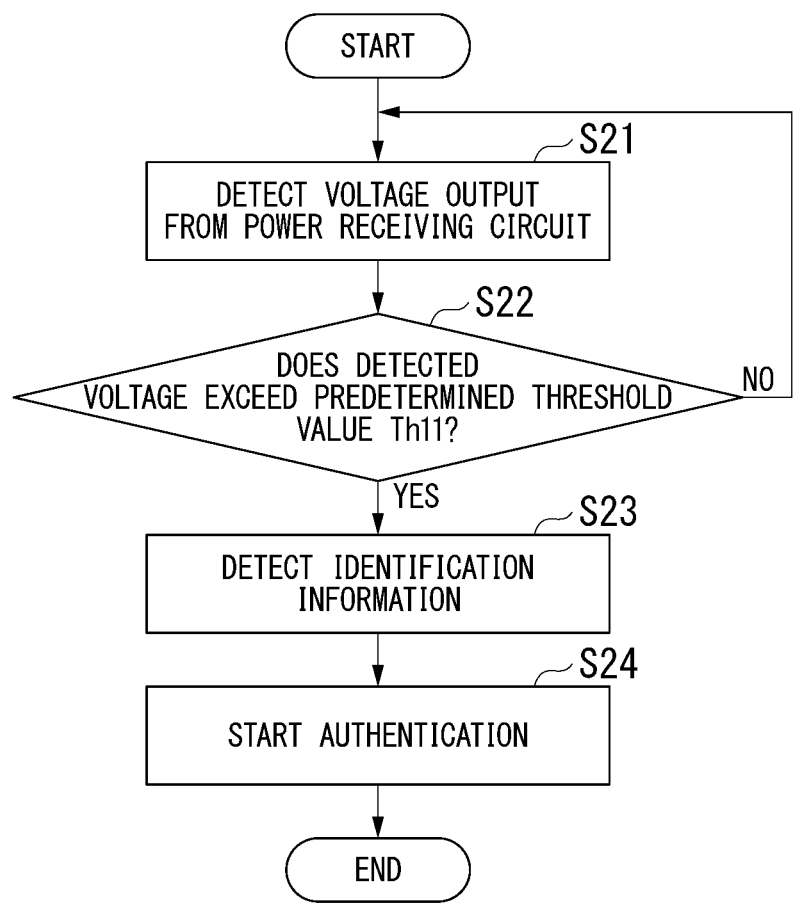
FIG. 5 is a diagram showing an example of a processing procedure performed in a wireless power receiving device according to the embodiment of the present disclosure.

Here, in the present embodiment, the wireless power transmission device 10 starts the main power feeding using the second power when the authentication of the wireless communication with the wireless power receiving device 20 has been completed. For example, even if alignment is not completed in a configuration in which the power transmission coil 121 of the wireless power transmission device 10 and the power receiving coil 141 of the wireless power receiving device 20 are being aligned, the wireless power transmission device 10 may start the main power feeding using the second power when the authentication of the wireless communication with the wireless power receiving device 20 has been completed. In the present embodiment, the processing of (step S22) shown in FIG. 5 is provided, so that the authentication process is started when the output from the power receiving circuit 131 in the wireless power receiving device 20 exceeds a predetermined threshold value. Therefore, it is possible to curb starting of the main power feeding using the second power in a state in which the alignment is not completed.

(Step S4)

The power transmission side control circuit 114 controls the power transmission circuit 112 so that switching is performed for supply of the second AC power from the power transmission circuit 112 to the power transmission coil unit 12. In the present embodiment, the main power feeding is performed by the second AC magnetic field from the second AC power using the second AC power. The process proceeds to the processing of step S5.

(Step S5)

The power transmission side control circuit 114 determines whether or not a load voltage of the wireless power receiving device 20 exceeds a predetermined threshold value Th1 based on a feedback signal transmitted from the power receiving side communication circuit 136 of the wireless power receiving device 20 to the power transmission side communication circuit 113. Here, for example, the predetermined threshold value Th1 is preset.

Regarding a result of this determination, when the power transmission side control circuit 114 determines that the load voltage in the wireless power receiving device 20 exceeds the predetermined threshold value Th1 (step S5: YES), the process proceeds to the processing of step S6.

On the other hand, regarding a result of this determination, when the power transmission side control circuit 114 determines that the load voltage in the wireless power receiving device 20 does not exceed the predetermined threshold value Th1 (i.e., the load voltage in the wireless power receiving device 20 is less than or equal to the predetermined threshold value Th1) (step S5: NO), the process proceeds to the processing of step S4. Also, for example, the processing of step S5 may be performed in parallel with the processing of step S4.

Here, in the present embodiment, in the wireless power receiving device 20, the power receiving side control circuit 135 controls the power receiving side communication circuit 136 so that a feedback signal is transmitted from the power receiving side communication circuit 136 to the power transmission side communication circuit 113 in relation to wireless power transmission.

In the present embodiment, the power receiving side control circuit 135 determines whether or not the load voltage detected by the load voltage detection circuit 134 exceeds the predetermined threshold value Th1. When the power receiving side control circuit 135 determines that the load voltage exceeds the predetermined threshold value Th1, the power receiving side control circuit 135 includes information representing that the load voltage exceeds the predetermined threshold value Th1 in the feedback signal.

In the present embodiment, a value of the load voltage when the battery of the moving object 30 is fully charged is set as the predetermined threshold value Th1. That is, in the wireless power transmission system 1 according to the present embodiment, various types of parameters regarding power transmission are set so that the load voltage exceeds the predetermined threshold value Th1 when the battery of the moving object 30 is fully charged.

Also, in the present embodiment, when the power receiving side control circuit 135 determines that the load voltage exceeds the predetermined threshold value Th1, the power receiving side communication circuit 136 is controlled so that wireless communication between the power receiving side communication circuit 136 and the power transmission side communication circuit 113 is disconnected.

(Step S6)

The power transmission side control circuit 114 controls the power transmission circuit 112 so that switching is performed for supply of the first AC power from the power transmission circuit 112 to the power transmission coil unit 12. In the present embodiment, the intermittent pattern representing the identification information is intermittently transmitted using the first AC power. The process proceeds to the processing of step S7. Also, the intermittent pattern will be described with reference to FIG. 6.

(Step S7)

The power transmission side control circuit 114 determines whether or not the load voltage of the wireless power receiving device 20 is less than a predetermined threshold value Th2 and the authentication of the wireless communication between the power receiving side communication circuit 136 of the wireless power receiving device 20 and the power transmission side communication circuit 113 has been completed based on a signal communicated between the power receiving side communication circuit 136 of the wireless power receiving device 20 and the power transmission side communication circuit 113. Here, the predetermined threshold value Th2 is a value less than the predetermined threshold value Th1. Also, for example, the predetermined threshold value Th2 is preset.

Regarding a result of this determination, when the power transmission side control circuit 114 determines that the load voltage in the wireless power receiving device 20 is less than the predetermined threshold value Th2 and the authentication of the wireless communication has been completed (step S7: YES), the process proceeds to the processing of step S8.

On the other hand, when the result of this determination is otherwise, the power transmission side control circuit 114 proceeds to the processing of step S6 (step S7: NO).

Here, in the present embodiment, the identification information detection circuit 133 constantly detects identification information included in the first AC power transmitted from the wireless power transmission device 10 even if the battery of the moving object 30 is fully charged and the wireless communication with the wireless power transmission device 10 is disconnected in the wireless power receiving device 20.

Also, in this case, in the wireless power receiving device 20, the power receiving side control circuit 135 determines whether or not the load voltage detected by the load voltage detection circuit 134 is less than the predetermined threshold value Th2.

In the present embodiment, a predetermined load voltage value for detecting that an amount of power of the battery of the moving object 30 has been decreased by more than a predetermined amount from the full charge is set as the predetermined threshold value Th2. That is, in the wireless power transmission system 1 according to the present embodiment, various types of parameters regarding power transmission are set so that the load voltage is less than the predetermined threshold value Th2 when the amount of power of the battery of the moving object 30 has been decreased from the full charge by more than the predetermined amount. As the predetermined threshold value Th2, for example, a value at which the resumption of the main power feeding is desired is set.

In the wireless power receiving device 20, the power receiving side control circuit 135 controls the power receiving side communication circuit 136 so that an authentication request for wireless communication is transmitted to the wireless power transmission device 10 when the load voltage is less than the predetermined threshold value Th2. When the authentication is completed, the main power feeding is performed using the second AC power from the wireless power transmission device 10.

(Step S8)

The power transmission side control circuit 114 controls the power transmission circuit 112 so that switching is performed for supply of the second AC power from the power transmission circuit 112 to the power transmission coil unit 12. In the present embodiment, the main power feeding is performed using the second AC power. The process of the present flow ends.

Also, for example, after the processing of step S8, the processing of steps S5 to S8 may be iterated again once or more.

In this manner, in the wireless power transmission device 10, the main power feeding is stopped and the identification information is transmitted again using the first AC power when the load 50 on the wireless power receiving device 20 side is fully charged. In the wireless power transmission device 10, when power is consumed by the load 50 on the wireless power receiving device 20 side and charging is required, a wireless communication authentication process is performed and the main power feeding is started using the second AC power after the authentication is completed. Also, these operations are automatically performed by the wireless power transmission device 10 and the wireless power receiving device 20.

In the wireless power transmission system according to the present embodiment, the wireless power transmission device 10 supplies power to the wireless power receiving device 20 in an intermittent pattern representing the identification information of the power transmission side communication circuit 113. Thereby, the wireless power receiving device 20 receives the identification information.

Therefore, in the wireless power transmission system according to the present embodiment, the wireless power receiving device 20 can identify a wireless communication circuit without using communication of the wireless communication circuit (the power transmission side communication circuit 113) of the wireless power transmission device 10.

In the wireless power transmission system according to the present embodiment, because the identification information for identifying the power transmission side communication circuit 113 is automatically transmitted from the wireless power transmission device 10 to the wireless power receiving device 20, it is possible to eliminate the time and effort of a customer of the wireless power transmission device 10 or the like necessary to modify a program of the wireless power transmission device 10 (for example, a part regarding the network identification information), for example, when the wireless power transmission device 10 is introduced or a layout is changed.

For example, network identification information may be common to a plurality of power transmission side devices located in the vicinity. In this case, a power receiving side device is likely to be erroneously connected to a power transmission side device other than a desired power transmission side device. On the other hand, when the network identification information is individually assigned to the power transmission side devices, a process of storing the network identification information for each charging station having a power transmission side device and rewriting the network identification information from the AGV to the power receiving side device so that the network identification information is designated is required in the AGV. In this case, the program is changed on the AGV side. Thus, work may be complicated when the power transmission side device is introduced and the layout is changed.

On the other hand, it is possible to reduce complexity of such work using the wireless power transmission device 10 according to the present embodiment as the power transmission side device and using the wireless power receiving device 20 according to the present embodiment as the power receiving side device.

<Process Performed by Wireless Power Receiving Device>

FIG. 5 is a diagram showing an example of a processing procedure performed by the wireless power receiving device 20 according to the embodiment of the present disclosure.

(Step S21)

In the wireless power receiving device 20, the output voltage detection circuit 132 detects a voltage output from the power receiving circuit 131 as an output voltage. The process proceeds to the processing of step S22.

(Step S22)

In the wireless power receiving device 20, the identification information detection circuit 133 determines whether or not the output voltage detected by the output voltage detection circuit 132 exceeds a predetermined threshold value Th11. Here, for example, the predetermined threshold value Th11 is preset.

Regarding a result of this determination, when the identification information detection circuit 133 determines that the detected output voltage exceeds the predetermined threshold value Th11 (step S22: YES), the process proceeds to the processing of step S23.

On the other hand, regarding a result of this determination, when the identification information detection circuit 133 determines that the detected output voltage does not exceed the predetermined threshold value Th11 (i.e., that the detected output voltage is less than or equal to the predetermined threshold value Th11) (step S22: NO), the process proceeds to the processing of step S21. The processing of step S21 and the processing of step S22 may be performed in parallel.

(Step S23)

In the wireless power receiving device 20, the identification information detection circuit 133 detects the identification information based on the output voltage detected by the output voltage detection circuit 132. The process proceeds to the processing of step S24.

(Step S24)

In the wireless power receiving device 20, the power receiving side control circuit 135 controls the power receiving side communication circuit 136 based on the identification information detected by the identification information detection circuit 133 so that an authentication request for wireless communication with the power transmission side communication circuit 113 of the wireless power transmission device 10 is transmitted to the power transmission side communication circuit 113. Thereby, the authentication is started. The process of the present flow ends.

In the present embodiment, in the wireless power receiving device 20, when the voltage detected by the output voltage detection circuit 132 exceeds the predetermined threshold value Th11, relative position between the power receiving coil 141 and the power transmission coil 121 of the wireless power transmission device 10 are considered to be within a wireless power transmission specification range and wireless power transmission is executed by detecting identification information and requesting authentication of wireless communication. On the other hand, in other cases, in the wireless power receiving device 20, the relative position is considered to be outside the power transmission specification range, the identification information is not detected and the wireless power transmission is not executed. Thereby, the execution of wireless power transmission outside the range of use is restricted.

Here, for example, the processing of steps S21 to S24 can be implemented as processing to be performed by the power receiving side control circuit 135. Specifically, information input from the identification information detection circuit 133 to the power receiving side control circuit 135 is configured to include output voltage information. Also, the processing of step S21 is regarded as a process in which the power receiving side control circuit 135 detects (ascertains) an output voltage, the processing of step S22 is regarded as a process in which the power receiving side control circuit 135 compares the output voltage with the predetermined threshold value Th11, and the processing of step S23 is regarded as a process in which the power receiving side control circuit 135 detects (ascertains) identification information.

Also, a configuration in which functions of one or both of the output voltage detection circuit 132 and the identification information detection circuit 133 are included in the power receiving side control circuit 135 may be used.

Also, a configuration in which some or all of functions of the output voltage detection circuit 132, the identification information detection circuit 133, and the power receiving side control circuit 135 are included in the power receiving side communication circuit 136 may be used.

In the wireless power transmission system according to the present embodiment, when the power transmission coil 121 of the wireless power transmission device 10 and the power receiving coil 141 of the wireless power receiving device 20 face each other, identification information for identifying a connection destination of wireless communication is transmitted from the power transmission coil unit 12 to the power receiving coil unit 21 by the first AC magnetic field from the first AC power. Thus, in the wireless power transmission system according to the present embodiment, the wireless power receiving device 20 can implement a wireless communication connection with the wireless power transmission device 10 that is an appropriate power feeding source for the wireless power receiving device 20 and curb a wireless communication connection with another wireless power transmission device. Thereby, an erroneous connection of such wireless communication can be curbed.

<Waveform of Signal Transmitted by Wireless Power Transmission Device>

Figure 6:
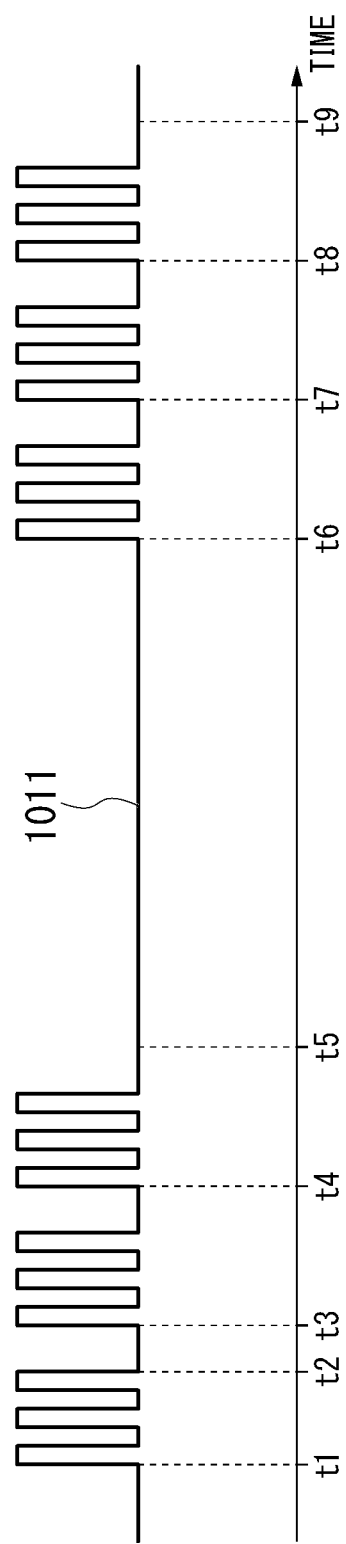
FIG. 6 is a diagram showing an example of a waveform of a signal transmitted with first AC power by the wireless power transmission device according to the embodiment of the present disclosure.

FIG. 6 is a diagram showing an example of a waveform 1011 of a signal transmitted with first AC power by the wireless power transmission device 10 according to the embodiment of the present disclosure.

The horizontal axis shown in FIG. 6 represents time.

In the waveform 1011, a waveform from time t1 to time t2 represents an intermittent pattern. Also, an amplitude of the waveform is zero from time t2 to time t3 (i.e., there is no waveform). A time length from time t1 to time t3 corresponds to a cycle of the intermittent pattern (which may also be referred to as an intermittent cycle of the intermittent pattern).

A waveform pattern from time t1 to time t3, a waveform pattern from time t3 to time t4, and a waveform pattern from time t4 to time t5 are the same.

An amplitude of the waveform is zero from time t5 to time t6 (i.e., there is no waveform).

A time length from time t1 to time t6 is an intermittent cycle for supplying the first AC power from the power transmission circuit 112 to the power transmission coil unit 12. After time t6, a waveform pattern, which is the same as the waveform pattern from time t1 to time t6, is iterated.

Here, the intermittent cycle of the first AC power transmission corresponding to the waveform pattern from time t1 to time t6 is longer than the cycle of the intermittent pattern corresponding to the waveform pattern from time t1 to time t3.

Here, the waveform of the intermittent pattern from time t1 to time t2 is a waveform in which identification information is represented by power transmitted from the power transmission coil unit 12 of the wireless power transmission device 10 to the power receiving coil unit 21 of the wireless power receiving device 20. In the example of FIG. 6, the waveform is a waveform corresponding to a bit pattern of the identification information. In the power transmission circuit 112 of the wireless power transmission device 10, the pattern of the first AC power corresponding to the waveform intermittently oscillates.

In the example of FIG. 6, a bit of a value of 1 and a bit of a value of 0 are represented by turning the power on and off. The identification information is represented by the information of a sequence of a plurality of bits, each of which has a value of 1 or 0.

In this manner, in the present embodiment, in the wireless power transmission device 10, the first AC power is not continuously transmitted from the power transmission circuit 112 to the power transmission coil unit 12. That is, in the wireless power transmission device 10, the intermittent pattern is not continuously transmitted from the power transmission circuit 112 to the power transmission coil unit 12.

<Regarding First Embodiment>

As described above, in the wireless power transmission system 1 according to the present embodiment, the wireless power transmission device 10, which wirelessly transmits power to the wireless power receiving device 20, has the following configuration.

That is, the wireless power transmission device 10 includes the power transmission coil 121, the power transmission circuit 112 configured to supply AC power to the power transmission coil 121, and the power transmission side communication circuit 113 configured to communicate with the wireless power receiving device 20.

The power transmission circuit 112 supplies the first AC power to the power transmission coil 121. The first AC power is AC power having a period in which power is intermittently supplied in an intermittent pattern representing the identification information of the power transmission side communication circuit 113. The power transmission coil 121 receives the first AC power and generates a first AC magnetic field corresponding to the intermittent pattern.

Therefore, in the wireless power transmission system 1 according to the present embodiment, the wireless power transmission device 10 enables the wireless power receiving device 20 to identify a wireless communication circuit without using communication of the wireless communication circuit of the wireless power transmission device 10 (the power transmission side communication circuit 113 in the present embodiment).

In the wireless power transmission device 10 of the wireless power transmission system 1 according to the present embodiment, as an example, the power transmission circuit 112 supplies the first AC power to the power transmission coil 121 in response to activation of the wireless power transmission device 10.

Therefore, in the wireless power transmission system 1 according to the present embodiment, the wireless power transmission device 10 transmits the identification information using the first AC power at a timing when the wireless power transmission device 10 has been activated. Thereby, the wireless power transmission device 10 may not have a function of detecting the approach of the wireless power receiving device 20.

In the wireless power transmission device 10 of the wireless power transmission system 1 according to the present embodiment, as another example, the power transmission circuit 112 supplies the first AC power to the power transmission coil 121 in response to detection of the approach of the wireless power receiving device 20 to the wireless power transmission device 10.

Therefore, in the wireless power transmission system 1 according to the present embodiment, the wireless power transmission device 10 transmits the identification information using the first AC power at a timing when the wireless power receiving device 20 has approached the wireless power transmission device 10. Thereby, the wireless power transmission device 10 can curb the transmission of the identification information when the wireless power receiving device 20 has not approached the wireless power transmission device 10 and can reduce power consumption.

In the wireless power transmission device 10 of the wireless power transmission system 1 according to the present embodiment, the power transmission circuit 112 intermittently supplies the first AC power. An intermittent cycle in which the power transmission circuit 112 intermittently supplies the first AC power is longer than a cycle of the intermittent pattern.

Therefore, in the wireless power transmission system 1 according to the present embodiment, the wireless power transmission device 10 can reduce power consumption by providing a period in which the first AC power is not supplied.

The wireless power transmission system 1 according to the present embodiment includes the wireless power transmission device 10 and the wireless power receiving device 20.

The wireless power receiving device 20 includes the power receiving coil 141, the power receiving circuit 131 configured to convert the AC power received by the power receiving coil 141 and supply the power to the load 50, and the power receiving side communication circuit 136 configured to communicate with the power transmission side communication circuit 113.

The power receiving side communication circuit 136 starts an authentication process with the power transmission side communication circuit 113 based on identification information detected from the first AC power received by the power receiving coil 141 via the first AC magnetic field.

Therefore, in the wireless power transmission system 1 according to the present embodiment, the wireless power receiving device 20 can automatedly start the authentication process of wireless communication with the wireless power transmission device 10.

In the wireless power transmission system 1 according to the present embodiment, the wireless power receiving device 20 further includes an output detection circuit (the output voltage detection circuit 132 in the present embodiment) configured to detect an output (for example, a voltage, a current, or power) from the power receiving circuit 131 and the identification information detection circuit 133 configured to detect identification information from the first AC power received by the power receiving coil 141 when the output detected by the output detection circuit exceeds a first threshold value (the threshold value Th11 in the flow shown in FIG. 5 in the present embodiment).

The first threshold value is an output detected by the output detection circuit with the first AC power received by the power receiving coil 141 when relative position between the power transmission coil 121 and the power receiving coil 141 is in a predetermined arrangement.

Therefore, when the power receiving coil 141 appropriately faces the power transmission coil 121, the wireless power receiving device 20 can detect the identification information and start an authentication process of wireless communication with the wireless power transmission device 10.

In the wireless power transmission system 1 according to the present embodiment, the wireless power receiving device 20 further includes the load voltage detection circuit 134 configured to detect a voltage of the load 50.

The power transmission circuit 112 supplies the second AC power, which is greater than the first AC power, to the power transmission coil 121 in response to the completion of the authentication process of the power transmission side communication circuit 113 and stops the supply of the second AC power to resume the supply of the first AC power when the voltage detected by the load voltage detection circuit 134 exceeds a third threshold value (the threshold value Th1 in the flow shown in FIG. 4 in the present embodiment).

Also, the power transmission circuit 112 resumes the supply of the second AC power after resuming the supply of the first AC power when the voltage detected by the load voltage detection circuit 134 is less than a fourth threshold value (the threshold value Th2 in the flow shown in FIG. 4 in the present embodiment), which is less than the third threshold value, and the power receiving side communication circuit 136 has completed the authentication process with the power transmission side communication circuit 113 based on the identification information detected from the first AC power.

Therefore, in the wireless power transmission system 1 according to the present embodiment, for example, when the load 50 on the wireless power receiving device 20 side is fully charged, the wireless power transmission device 10 can stop the main power feeding using the second AC power. Subsequently, when an amount of charge of the load 50 is reduced from the full charge by a predetermined amount, the wireless power transmission device 10 can resume the main power feeding using the second AC power.

Second Embodiment

Figure 7:
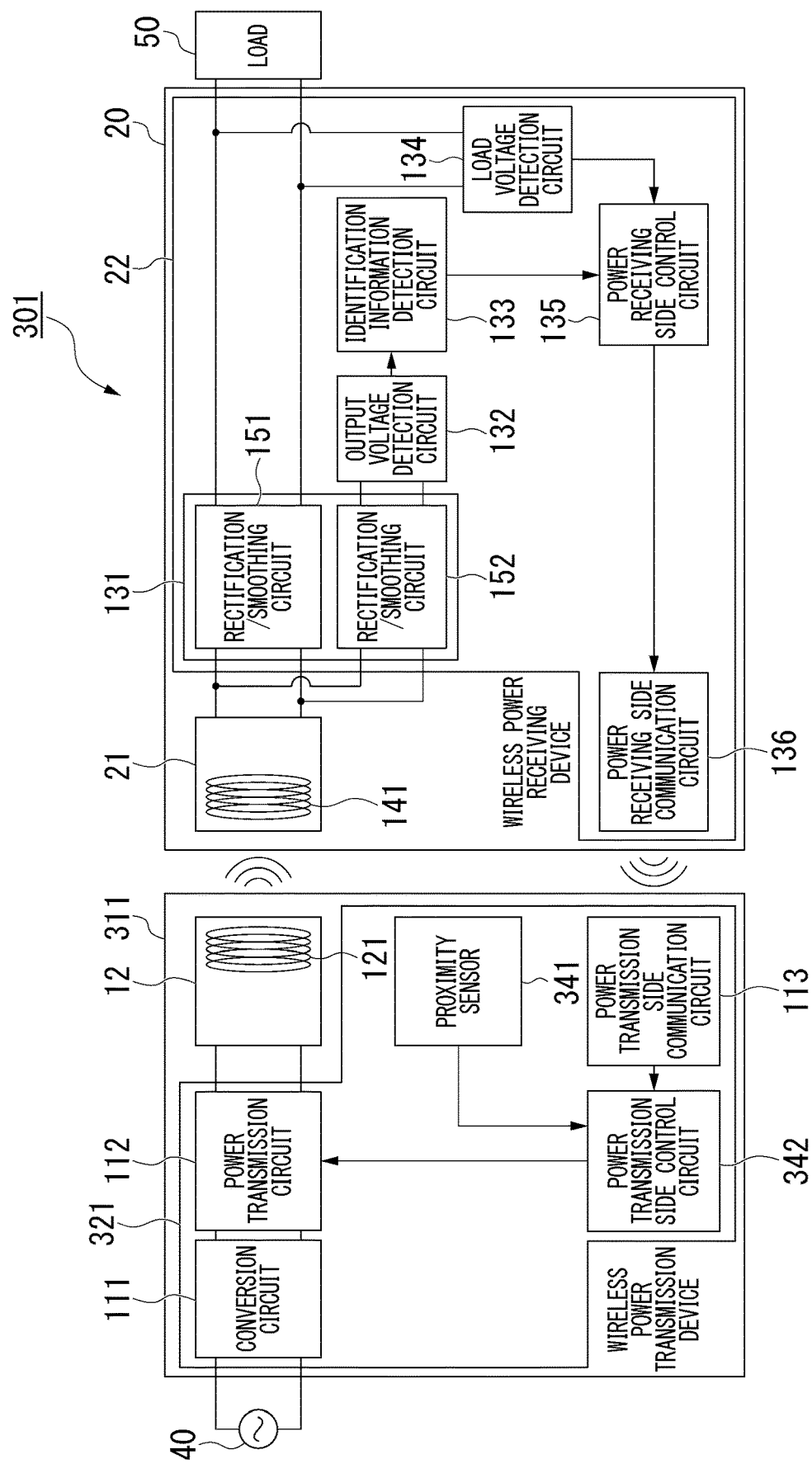
FIG. 7 is a diagram showing functional blocks of a wireless power transmission system according to an embodiment of the present disclosure (a second embodiment).

FIG. 7 is a diagram showing functional blocks of a wireless power transmission system 301 according to an embodiment of the present disclosure (a second embodiment).

In the example of FIG. 7, for convenience of description, parts similar to those of the configuration shown in FIG. 2 are denoted by the same reference signs.

In the present embodiment, differences from the wireless power transmission system 1 shown in FIG. 2 will be mainly described in detail and detailed description of similarities will be omitted.

The wireless power transmission system 301 includes a wireless power transmission device 311 and a wireless power receiving device 20.

Also, in FIG. 7, an AC source 40 and a load 50 are shown.

Here, the wireless power receiving device 20, the AC source 40, and the load 50 are similar to those shown in FIG. 2.

The wireless power transmission device 311 will be described.

The wireless power transmission device 311 includes a power transmission unit 321 and a power transmission coil unit 12.

The power transmission unit 321 includes a conversion circuit 111, a power transmission circuit 112, a power transmission side communication circuit 113, a proximity sensor 341, and a power transmission side control circuit 342.

Here, the power transmission coil unit 12, the conversion circuit 111, the power transmission circuit 112, and the power transmission side communication circuit 113 are similar to those shown in FIG. 2.

The proximity sensor 341 and the power transmission side control circuit 342 will be described.

The proximity sensor 341 is a sensor that detects a physical object located in a predetermined area. In the present embodiment, the predetermined area is configured to be an area near the power transmission coil unit 12. Thereby, the proximity sensor 341 detects a physical object approaching the vicinity of the power transmission coil unit 12. The proximity sensor 341 outputs a physical object detection result to the power transmission side control circuit 342.

Also, although the proximity sensor 341 can detect a physical object other than the wireless power receiving device 20 in the present embodiment, a case in which the wireless power receiving device 20 is detected will be described for convenience of description. Also, in the present embodiment, when the proximity sensor 341 has detected a physical object other than the wireless power receiving device 20, there is an error representing that the physical object which is the power feeding destination is not the wireless power receiving device 20. In this regard, as one configuration example, a configuration in which, when the authentication process of the wireless communication is not started even if a predetermined time period has elapsed after the transmission of the identification information was started using the first AC power, the wireless power transmission device 311 recognizes (determines) that the proximity sensor 341 has detected a physical object other than the wireless power receiving device 20 and stops the transmission of the identification information using the first AC power may be used.

The power transmission side control circuit 342 is different from the power transmission side control circuit 114 shown in FIG. 2 in that control corresponding to the proximity sensor 341 is performed and is similar to the power transmission side control circuit 114 shown in FIG. 2 in terms of other points.

That is, in the present embodiment, in the wireless power transmission device 311, a condition that the proximity sensor 341 has detected a physical object is used as a predetermined condition that becomes a trigger for starting the transmission of the identification information of the power transmission side communication circuit 113 using wireless power transmission.

When information representing that the physical object has been detected by the proximity sensor 341 has been input, the power transmission side control circuit 342 controls the power transmission circuit 112 so that the transmission of the identification information of the power transmission side communication circuit 113 is started using wireless power transmission.

<Regarding Second Embodiment>

As described above, in the wireless power transmission system 301 according to the present embodiment, the wireless power transmission device 311 further includes the proximity sensor 341 configured to detect approach of the wireless power receiving device 20 to the wireless power transmission device 311.

The power transmission circuit 112 supplies the first AC power to the power transmission coil 121 in response to the detection of the approach of the wireless power receiving device 20 to the wireless power transmission device 311 by the proximity sensor 341.

Therefore, in the wireless power transmission system 301 according to the present embodiment, the wireless power transmission device 311 transmits the identification information using the first AC power at a timing when the wireless power receiving device 20 has approached the wireless power transmission device 311. Thereby, the wireless power transmission device 311 can curb the transmission of the identification information when the wireless power receiving device 20 has not approached the wireless power transmission device 311 and can reduce power consumption.

Third Embodiment

Figure 8:
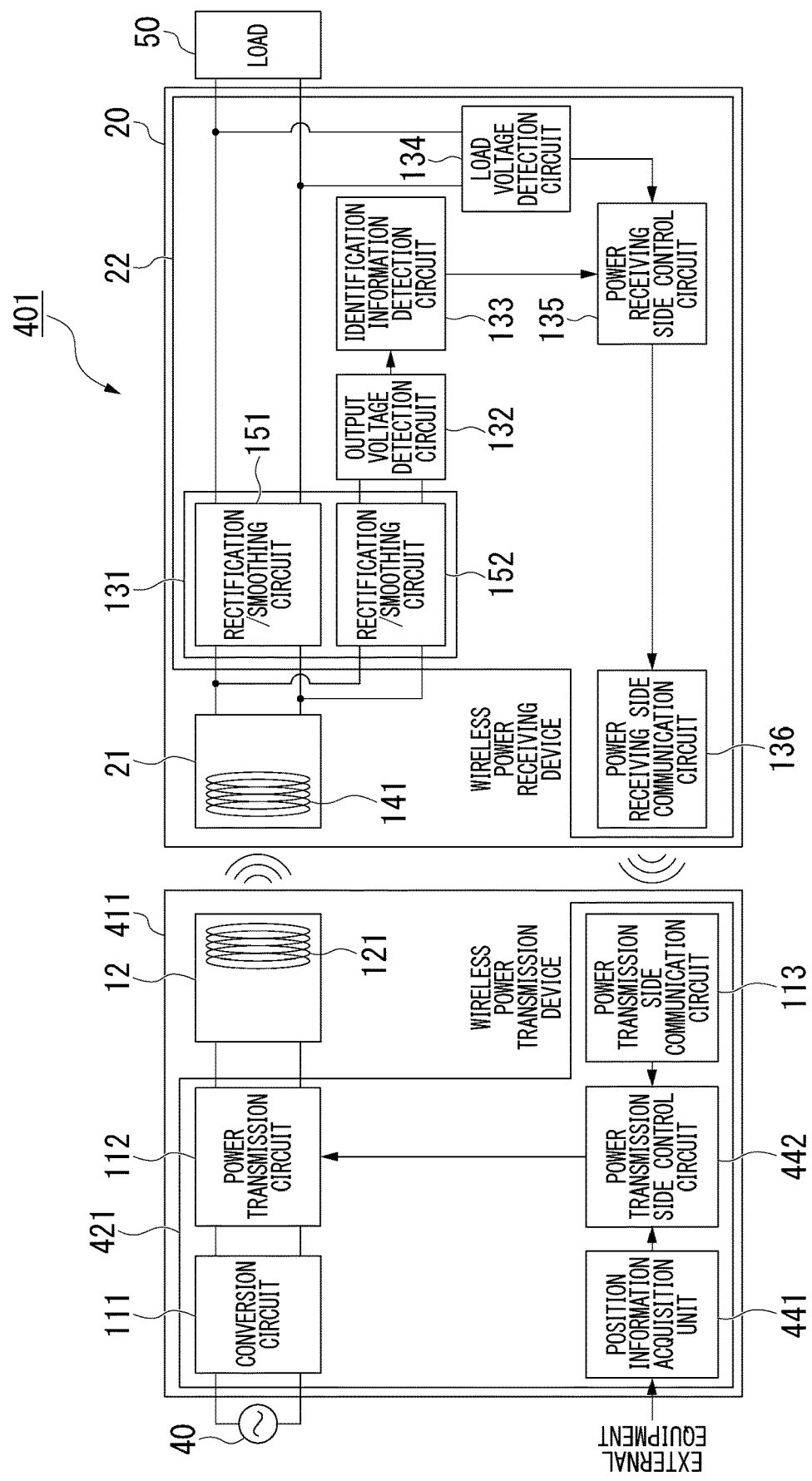
FIG. 8 is a diagram showing functional blocks of a wireless power transmission system according to an embodiment of the present disclosure (a third embodiment).

FIG. 8 is a diagram showing functional blocks of a wireless power transmission system 401 according to an embodiment of the present disclosure (a third embodiment). In the example of FIG. 8, for convenience of explanation, parts similar to those of the configuration shown in FIG. 2 are denoted by the same reference signs.

In the present embodiment, differences from the wireless power transmission system 1 shown in FIG. 2 will be mainly described in detail and detailed description of similarities will be omitted.

The wireless power transmission system 401 includes a wireless power transmission device 411 and a wireless power receiving device 20.

Also, an AC source 40 and a load 50 are shown in FIG. 8.

Here, the wireless power receiving device 20, the AC source 40, and the load 50 are similar to those shown in FIG. 2.

The wireless power transmission device 411 will be described.

The wireless power transmission device 411 includes a power transmission unit 421 and a power transmission coil unit 12.

The power transmission unit 421 includes a conversion circuit 111, a power transmission circuit 112, a power transmission side communication circuit 113, a position information acquisition unit 441, and a power transmission side control circuit 442.

Here, the power transmission coil unit 12, the conversion circuit 111, the power transmission circuit 112, and the power transmission side communication circuit 113 are similar to those shown in FIG. 2.

The position information acquisition unit 441 and the power transmission side control circuit 442 will be described.

In the present embodiment, external equipment, which is equipment provided outside the wireless power transmission system 401, detects information about a position of the wireless power receiving device 20. The external equipment outputs the information to the position information acquisition unit 441 of the wireless power transmission device 10.

Here, in the present embodiment, a position of the moving object 30 on which the wireless power receiving device 20 is mounted may be used instead of the position of the wireless power receiving device 20 as long as there is no practical problem.

Also, the external equipment may be a device that manages positions of one or more moving objects 30, for example, in a factory or the like. In the factory or the like, the external equipment may be configured to manage a position of a moving object 30 when a path of a change (i.e., movement) in positions of one or more moving objects 30 and a change over time are preset. The external equipment may detect a position of each moving object 30 in real time or ascertain the position of the moving object 30 based on preset movement schedule and time information of the moving object 30. Also, the position of the wireless power receiving device 20 may be used instead of the position of the moving object 30.

The position information acquisition unit 441 inputs information output from the external equipment and outputs the input information to the power transmission side control circuit 442.

The power transmission side control circuit 442 is different from the power transmission side control circuit 114 shown in FIG. 2 in that control corresponding to the position information acquisition unit 441 is performed and the power transmission side control circuit 442 is similar to the power transmission side control circuit 114 shown in FIG. 2 in terms of other points.

That is, in the present embodiment, a condition that the wireless power receiving device 20 serving as the power feeding destination has approached the power transmission coil unit 12 based on information input from the position information acquisition unit 441 is used as a predetermined condition that becomes a trigger for starting the transmission of the identification information of the power transmission side communication circuit 113 using wireless power transmission in the wireless power transmission device 411.

Here, for example, a condition that the wireless power receiving device 20 serving as the power feeding destination has reached a predetermined position is used as the condition that the wireless power receiving device 20 serving as the power feeding destination has approached the power transmission coil unit 12. For example, the predetermined position is preset.

As an example, a configuration in which, when the wireless power receiving device 20 serving as the power feeding destination has reached the predetermined position, predetermined information is output from the external equipment to the position information acquisition unit 441 may be used. In this configuration, the position information acquisition unit 441 acquires information input from the external equipment and outputs the information to the power transmission side control circuit 442 as it is or converts the information to output the converted information to the power transmission side control circuit 442. The power transmission side control circuit 442 causes transmission of the identification information to be started when the information has been input from the position information acquisition unit 441.

As another example, a configuration in which information representing the position of the wireless power receiving device 20 serving as the power feeding destination is output from the external equipment to the position information acquisition unit 441 may be used. In this configuration, the position information acquisition unit 441 acquires information input from the external equipment and outputs the information to the power transmission side control circuit 442 as it is or converts the information to output the converted information to the power transmission side control circuit 442. The power transmission side control circuit 442 determines whether or not the condition that the wireless power receiving device 20 serving as the power feeding destination has reached a predetermined position has been satisfied based on the information input from the position information acquisition unit 441 and causes the transmission of the identification information to be started when it is determined that the condition has been satisfied. For example, information of a determination criterion for making such a determination is preset in the power transmission side control circuit 442. For example, the information of the determination criterion may include information of a map of a factory or the like where the moving object 30 moves.

<Regarding Third Embodiment>

As described above, in the wireless power transmission system 401 according to the present embodiment, the wireless power transmission device 411 further includes the position information acquisition unit 441 configured to acquire the position information of the moving object 30 on which the wireless power receiving device 20 is mounted.

The power transmission circuit 112 supplies the first AC power to the power transmission coil 121 in response to the detection of the approach of the wireless power receiving device 20 to the wireless power transmission device 411 based on the position information.

Therefore, in the wireless power transmission system 401 according to the present embodiment, the wireless power transmission device 411 transmits the identification information using the first AC power at a timing when the wireless power receiving device 20 has approached the wireless power transmission device 411. Thereby, the wireless power transmission device 411 can curb the transmission of the identification information when the wireless power receiving device 20 has not approached the wireless power transmission device 411 and can reduce power consumption.

Fourth Embodiment

Figure 9:
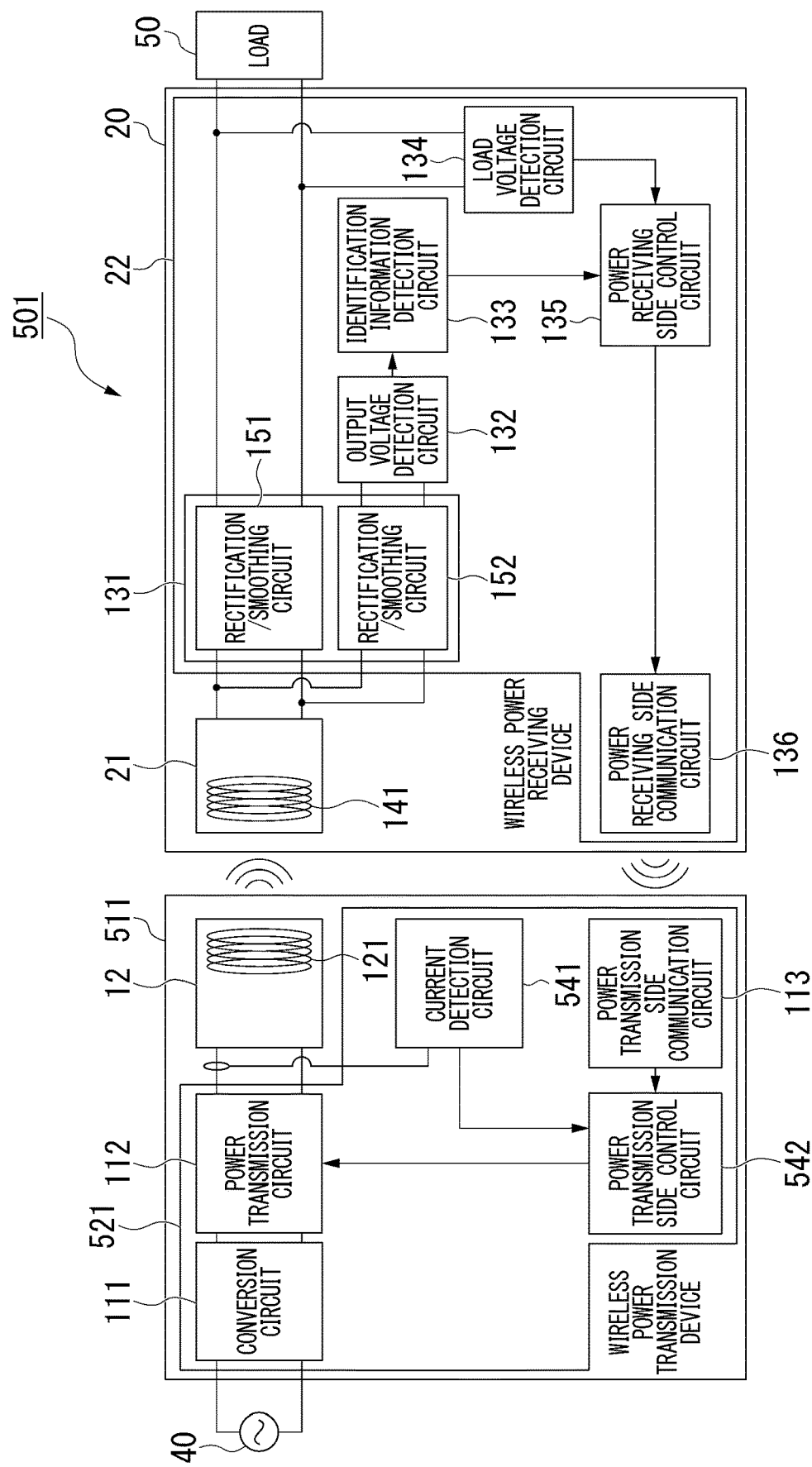
FIG. 9 is a diagram showing functional blocks of a wireless power transmission system according to one embodiment of the present disclosure (a fourth embodiment).

FIG. 9 is a diagram showing functional blocks of a wireless power transmission system 501 according to an embodiment of the present disclosure (a fourth embodiment).

In the example of FIG. 9, parts similar to those of the configuration shown in FIG. 2 are denoted by the same reference signs for convenience of explanation.

In the present embodiment, differences from the wireless power transmission system 1 shown in FIG. 2 will be described in detail and detailed description of similarities will be omitted.

The wireless power transmission system 501 includes a wireless power transmission device 511 and a wireless power receiving device 20.

Also, an AC source 40 and a load 50 are shown in FIG. 9.

Here, the wireless power receiving device 20, the AC source 40, and the load 50 are similar to those shown in FIG. 2.

The wireless power transmission device 511 will be described.

The wireless power transmission device 511 includes a power transmission unit 521 and a power transmission coil unit 12.

The power transmission unit 521 includes a conversion circuit 111, a power transmission circuit 112, a power transmission side communication circuit 113, a current detection circuit 541, and a power transmission side control circuit 542.

Here, the power transmission coil unit 12, the conversion circuit 111, the power transmission circuit 112, and the power transmission side communication circuit 113 are similar to those shown in FIG. 2.

The current detection circuit 541 and the power transmission side control circuit 542 will be described.

The current detection circuit 541 detects a current that flows when power is supplied from the power transmission circuit 112 to the power transmission coil unit 12. The current detection circuit 541 outputs information of the detected current to the power transmission side control circuit 542.

The power transmission side control circuit 542 inputs information output from the current detection circuit 541 and controls the power transmission circuit 112 based on the input information.

Figure 10:
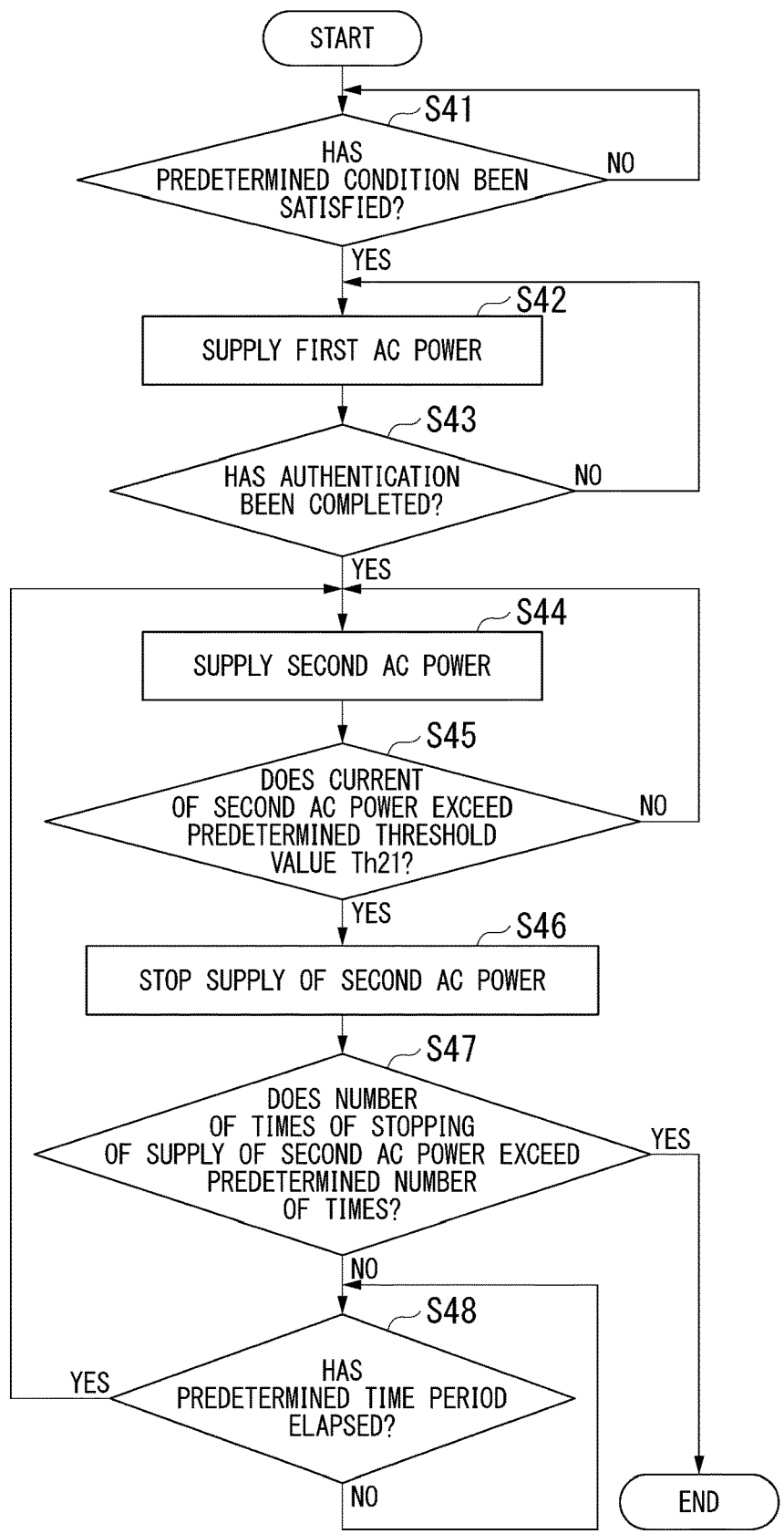
FIG. 10 is a diagram showing an example of a processing procedure performed in the wireless power transmission device according to the embodiment of the present disclosure.

FIG. 10 is a diagram showing an example of a processing procedure performed in the wireless power transmission device 511 according to an embodiment of the present disclosure.

In the flow shown in FIG. 10, the processing of step S41, step S42, step S43, and step S44 is similar to the processing of step S1, step S2, step S3, and step S4 shown in FIG. 4 and detailed description thereof will be omitted. After the processing of step S44, the process proceeds to the processing of step S45.

(Step S45)

The power transmission side control circuit 542 determines whether or not a current of second AC power detected by the current detection circuit 541 exceeds a predetermined threshold value Th21.

Regarding a result of this determination, when the power transmission side control circuit 542 determines that the current of the second AC power exceeds the predetermined threshold value Th21 (step S45: YES), the process proceeds to the processing of step S46.

On the other hand, regarding a result of this determination, when the power transmission side control circuit 542 determines that the current of the second AC power does not exceed the predetermined threshold value Th21 (i.e., the current of the second AC power is less than or equal to the predetermined threshold value Th21) (step S45: NO), the process proceeds to the processing of step S44. For example, the processing of step S45 may be performed in parallel with the processing of step S44.

(Step S46)

The power transmission side control circuit 542 controls the power transmission circuit 112 so that the supply of the second AC power from the power transmission circuit 112 to the power transmission coil unit 12 is stopped. Thereby, the supply of the second AC power is stopped. The process proceeds to the processing of step S47.

Here, for example, a boundary value of the current specification range of the second AC power or a close value less than the boundary value may be used as the predetermined threshold value Th21. In this case, in the processing of step S46, a power feeding operation can be stopped by the overcurrent protection when the power feeding is started outside the specification range of the current of the second AC power.

(Step S47)

The power transmission side control circuit 542 determines whether or not the number of times the second AC power has been stopped exceeds the predetermined number of times for each power feeding operation in the wireless power receiving device 20 of the same supply destination. Here, for example, the predetermined number of times is preset.

Regarding a result of this determination, when the power transmission side control circuit 542 determines that the number of times the second AC power has been stopped exceeds the predetermined number of times (step S47: YES), the process of the present flow ends. In this case, for example, the power transmission side control circuit 542 provides an error notification. The error notification may be performed, for example, by displaying of a predetermined screen, outputting of a predetermined sound, predetermined vibrations, outputting of predetermined information to another predetermined device, or the like.

On the other hand, regarding a result of this determination, when the power transmission side control circuit 542 determines that the number of times the second AC power has been stopped does not exceed the predetermined number of times (i.e., the number of times the second AC power has been stopped is less than or equal to the predetermined number of times) (step S47: NO), the process proceeds to the processing of step S48.

Here, in the present embodiment, the number of times the second AC power has been stopped used in the determination of step S47 is the number of stops during one operation of charging the battery of the moving object 30. For example, a case in which the relative position between the power transmission coil 121 of the wireless power transmission device 10 and the power receiving coil 141 of the wireless power receiving device 20 is not appropriate or a case in which an abnormality has occurred in the wireless power transmission device 10 or the wireless power receiving device 20 is conceivable as a case in which the number of times the second AC power has been stopped exceeds the predetermined number of times.

(Step S48)

The power transmission side control circuit 542 determines whether or not a predetermined time period has elapsed from the stopping of the supply of the second AC power. Here, for example, the predetermined time period is preset.

Regarding a result of this determination, when the power transmission side control circuit 542 determines that the predetermined time period has elapsed from the stopping of the supply of the second AC power (step S48: YES), the process proceeds to the processing of step S44.

On the other hand, regarding a result of this determination, when the power transmission side control circuit 542 determines that the predetermined time period has not elapsed from the stopping of the supply of the second AC power (step S48: NO), the processing of step S48 is iterated. That is, the power transmission side control circuit 542 waits until the predetermined time period elapses.

Here, as the predetermined time period used in the processing of step S48, any time period may be set, and, for example, a time period in which it is assumed that, after the supply of the second AC power is stopped, the moving object 30 moves and hence the power receiving coil 141 of the wireless power receiving device 20 moves to an appropriate position for power feeding may be set. The predetermined time period is a standby time period for retrying to feed power using the second AC power.

Also, in the processing of step S47, the end of retrying to feed power when the number of operations of retrying to feed power using the second AC power exceeds an upper limit value is implemented.

<Regarding Fourth Embodiment>

As described above, in the wireless power transmission system 501 according to the present embodiment, the wireless power transmission device 511 further includes the current detection circuit 541 configured to detect a current of the AC power supplied from the power transmission circuit 112 to the power transmission coil 121.

The power transmission circuit 112 supplies the second AC power greater than the first AC power to the power transmission coil in response to the completion of the authentication process of the power transmission side communication circuit 113. When the current of the second AC power detected by the current detection circuit 541 exceeds the second threshold value (the threshold value Th21 in the flow shown in FIG. 10 in the present embodiment), the power transmission circuit 112 stops the supply of the second AC power to the power transmission coil 121 and resumes the supply of the second AC power to the power transmission coil 121 after the elapse of a predetermined time period.

Therefore, in the wireless power transmission system 501 according to the present embodiment, the wireless power transmission device 511 can perform overcurrent protection in relation to the main power feeding using the second AC power.

Further, in the wireless power transmission system 501 according to the present embodiment, in the wireless power transmission device 511, the power transmission circuit 112 does not resume the supply of the second AC power to the power transmission coil 121 when the number of operations of stopping the supply of the second AC power to the power transmission coil 121 exceeds the predetermined number of times.

Therefore, in the wireless power transmission system 501 according to the present embodiment, the wireless power transmission device 511 can end the main power feeding using the second AC power when the overcurrent protection state has occurred a predetermined number of times. Thereby, it is possible to distinguish a case in which relative position between the power transmission coil 121 of the wireless power transmission device 511 and the power receiving coil 141 of the wireless power receiving device 20 is not appropriate and a case in which an abnormality has occurred and it is possible to reliably end the main power feeding when an abnormality has occurred. That is, when the relative position between the power transmission coil 121 of the wireless power transmission device 511 and the power receiving coil 141 of the wireless power receiving device 20 is not appropriate, the relative position can be adjusted, but recovery is impossible even if a time period elapses when an abnormality has occurred.

Also, in the present embodiment, overcurrent protection for stopping the supply of the second AC power from the power transmission circuit 112 to the power transmission coil unit 12 when the current of the second AC power exceeds the predetermined threshold value Th21 by providing the processing of (step S45) shown in FIG. 10 and resuming the supply of the second AC power to the power transmission coil 121 after the elapse of a predetermined time period is performed. Thereby, even if the main power feeding is started using the second power in a state in which the alignment is not completed as described in the first embodiment, the operation of the main power feeding can be stopped.

<Regarding Above Embodiments>

Here, for example, a combination of configurations shown in two or more different embodiments among the configurations shown in the second embodiment, the third embodiment, and the fourth embodiment may be implemented.

Also, a program for implementing the function of any component of any device such as the wireless power transmission device 10 or the wireless power receiving device 20 described above may be recorded on a computer-readable recording medium and the program may be read and executed by a computer system. Also, the "computer system" used here may include an operating system (OS) or hardware such as peripheral devices. Also, the "computer-readable recording medium" refers to a storage device such as a flexible disc, a magneto-optical disc, a read-only memory (ROM), a portable medium such as a compact disc-ROM (CD-ROM), and a hard disk embedded in the computer system. Furthermore, the "computer-readable recording medium" is assumed to include a medium that holds a program for a constant period of time, such as a volatile memory inside a computer system serving as a server or a client when the program is transmitted via a network such as the Internet or a communication circuit such as a telephone circuit. For example, the volatile memory may be a random-access memory (RAM). For example, the recording medium may be a non-transitory storage medium.

Also, the above-described program may be transmitted from a computer system storing the program in a storage device or the like to another computer system via a transmission medium or by transmission waves in a transmission medium. Here, the "transmission medium" for transmitting the program refers to a medium having a function of transmitting information, as in a network such as the Internet or a communication circuit such as a telephone circuit.

Also, the above-described program may be a program for implementing some of the above-described functions. Further, the above-described program may be a so-called differential file capable of implementing the above-described function in combination with a program already recorded on the computer system. The differential file may be referred to as a differential program.

Also, the function of any component of any device such as the wireless power transmission device 10 or the wireless power receiving device 20 described above may be implemented by a processor. For example, each process in the present embodiment may be implemented by a processor that operates based on information of a program or the like and a computer-readable recording medium that stores information of a program or the like. Here, in the processor, for example, the function of each part may be implemented by individual hardware or the function of each part may be implemented by integrated hardware. For example, the processor may include hardware and the hardware may include at least one of a circuit that processes a digital signal and a circuit that processes an analog signal. For example, the processor may be configured using one or more circuit devices or/and one or more circuit elements mounted on a circuit board. An integrated circuit (IC) or the like may be used as the circuit device and a resistor, a capacitor, or the like may be used as the circuit element.

Here, the processor may be, for example, a CPU. However, the processor is not limited to the CPU and, for example, various types of processors such as a graphics processing unit (GPU) or a digital signal processor (DSP) may be used. Also, for example, the processor may be a hardware circuit based on an application specific integrated circuit (ASIC). Also, the processor may include, for example, a plurality of CPUs, or may include a hardware circuit of a plurality of ASICs. Also, the processor may include, for example, a combination of a plurality of CPUs and a hardware circuit including a plurality of ASICs. Also, the processor may include, for example, one or more of an amplifier circuit and a filter circuit for processing an analog signal and the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES 1, 301, 401, 501 Wireless power transmission system
10, 311, 411, 511 Wireless power transmission device
11, 321, 421, 521 Power transmission unit
12 Power transmission coil unit
20 Wireless power receiving device
21 Power receiving coil unit
22 Power receiving unit
30 Moving object
40 AC source
50 Load
111 Conversion circuit
112 Power transmission circuit
113 Power transmission side communication circuit
114, 342, 442, 542 Power transmission side control circuit
131 Power receiving circuit
132 Output voltage detection circuit
133 Identification information detection circuit
134 Load voltage detection circuit
135 Power receiving side control circuit
136 Power receiving side communication circuit
211 User
341 Proximity Sensor
441 Position information acquisition unit
541 Current detection circuit
1011 Waveform

What is claimed is:

1. A wireless power transmission system comprising:
a wireless power transmission device for wirelessly transmitting power to a wireless power receiving device; and
the wireless power receiving device,
wherein the wireless power transmission device comprises:
a power transmission coil;
a power transmission circuit configured to supply alternating current (AC) power to the power transmission coil; and
a power transmission side communication circuit configured to communicate with the wireless power receiving device,
wherein the power transmission circuit is configured to supply a first AC power to the power transmission coil,
wherein the first AC power is an AC power having an intermittent supply period in an intermittent pattern representing identification information of the power transmission side communication circuit, and
wherein the power transmission coil is configured to receive the first AC power and generate a first AC magnetic field corresponding to the intermittent pattern,
wherein the wireless power receiving device includes:
a power receiving coil;
a power receiving circuit configured to convert an AC power received by the power receiving coil and supply the converted AC power to a load; and
a power receiving side communication circuit configured to communicate with the power transmission side communication circuit, and
wherein the power receiving side communication circuit starts an authentication process with the power transmission side communication circuit based on the identification information detected from the first AC power received by the power receiving coil via the first AC magnetic field,
wherein the wireless power transmission system further comprises:
an output detection circuit configured to detect an output from the power receiving circuit; and
an identification information detection circuit configured to detect the identification information from the first AC power received by the power receiving coil when the output detected by the output detection circuit exceeds a first threshold value,
wherein the first threshold value is the output detected by the output detection circuit with the first AC power received by the power receiving coil when a relative position between the power transmission coil and the power receiving coil is in a predetermined arrangement.

2. The wireless power transmission system according to claim 1,
wherein the power transmission circuit is configured to supply the first AC power to the power transmission coil in response to detection of approach of the wireless power receiving device to the wireless power transmission device.

3. The wireless power transmission system according to claim 2,
wherein the wireless power transmission device further comprises a proximity sensor configured to detect the approach of the wireless power receiving device to the wireless power transmission device,
wherein the power transmission circuit is configured to supply the first AC power to the power transmission coil in response to the detection of the approach of the wireless power receiving device to the wireless power transmission device by the proximity sensor.

4. The wireless power transmission system according to claim 2,
wherein the wireless power transmission device further comprise a position information acquisition unit configured to acquire position information of a moving object on which the wireless power receiving device is mounted,
wherein the power transmission circuit is configured to supply the first AC power to the power transmission coil in response to the detection of the approach of the wireless power receiving device to the wireless power transmission device based on the position information.

5. The wireless power transmission system according to claim 1,
wherein the power transmission circuit is configured to supply the first AC power to the power transmission coil in response to activation of the wireless power transmission device.

6. The wireless power transmission system according to claim 1, wherein the power transmission circuit intermittently supplies the first AC power, and an intermittent cycle in which the power transmission circuit intermittently supplies the first AC power is longer than a cycle of the intermittent pattern.

7. The wireless power transmission system according to claim 1, further comprising a current detection circuit configured to detect a current of AC power supplied from the power transmission circuit to the power transmission coil, wherein the power transmission circuit is configured to supply a second AC power greater than the first AC power to the power transmission coil in response to completion of the authentication process of the power transmission side communication circuit, and the power transmission circuit is configured to stop the supply of the second AC power to the power transmission coil when the current of the second AC power detected by the current detection circuit exceeds a second threshold value and resumes the supply of the second AC power to the power transmission coil after an elapse of a predetermined time period.

8. The wireless power transmission system according to claim 7, wherein the power transmission circuit is configured not to resume the supply of the second AC power to the power transmission coil when the number of operations of stopping the supply of the second AC power to the power transmission coil exceeds a predetermined number of times.

9. The wireless power transmission system according to claim 7, further comprising a load voltage detection circuit configured to detect a voltage of the load, wherein the power transmission circuit configured to: stop the supply of the second AC power and resume the supply of the first AC power when the voltage detected by the load voltage detection circuit exceeds a third threshold value; and resume the supply of the second AC power after resuming the supply of the first AC power when the voltage detected by the load voltage detection circuit is less than a fourth threshold value, which is less than the third threshold value, and the power receiving side communication circuit has completed the authentication process with the power transmission side communication circuit based on the identification information detected from the first AC power.

10. A wireless power transmission system comprising:
a wireless power transmission device for wirelessly transmitting power to a wireless power receiving device; and
the wireless power receiving device,
wherein the wireless power transmission device comprises:
 a power transmission coil;
 a power transmission circuit configured to supply alternating current (AC) power to the power transmission coil; and
 a power transmission side communication circuit configured to communicate with the wireless power receiving device,
wherein the power transmission circuit is configured to supply a first AC power to the power transmission coil,
wherein the first AC power is an AC power having an intermittent supply period in an intermittent pattern representing identification information of the power transmission side communication circuit, and wherein the power transmission coil is configured to receive the first AC power and generate a first AC magnetic field corresponding to the intermittent pattern, wherein the wireless power receiving device includes:
 a power receiving coil;
 a power receiving circuit configured to convert an AC power received by the power receiving coil and supply the converted AC power to a load; and
 a power receiving side communication circuit configured to communicate with the power transmission side communication circuit, and wherein the power receiving side communication circuit starts an authentication process with the power transmission side communication circuit based on the identification information detected from the first AC power received by the power receiving coil via the first AC magnetic field, wherein the wireless power transmission system further comprises a load voltage detection circuit configured to detect a voltage of the load, wherein the power transmission circuit configured to:
supply a second AC power, which is greater than the first AC power, to the power transmission coil in response to completion of the authentication process of the power transmission side communication circuit; stop the supply of the second AC power and resume the supply of the first AC power when the voltage detected by the load voltage detection circuit exceeds a third threshold value; and resume the supply of the second AC power after resuming the supply of the first AC power when the voltage detected by the load voltage detection circuit is less than a fourth threshold value, which is less than the third threshold value, and the power receiving side communication circuit has completed the authentication process with the power transmission side communication circuit based on the identification information detected from the first AC power.

11. The wireless power transmission system according to claim 10, wherein the power transmission circuit is configured to supply the first AC power to the power transmission coil in response to detection of approach of the wireless power receiving device to the wireless power transmission device.

12. The wireless power transmission system according to claim 11, wherein the wireless power transmission device further comprises a proximity sensor configured to detect the approach of the wireless power receiving device to the wireless power transmission device, wherein the power transmission circuit is configured to supply the first AC power to the power transmission coil in response to the detection of the approach of the wireless power receiving device to the wireless power transmission device by the proximity sensor.

13. The wireless power transmission system according to claim 11, wherein the wireless power transmission device further comprise a position information acquisition unit configured to acquire position information of a moving object on which the wireless power receiving device is mounted, wherein the power transmission circuit is configured to supply the first AC power to the power transmission coil in response to the detection of the approach of the wireless power receiving device to the wireless power transmission device based on the position information.

14. The wireless power transmission system according to claim 10,
    wherein the power transmission circuit is configured to supply the first AC power to the power transmission coil in response to activation of the wireless power transmission device.

15. The wireless power transmission system according to claim 10,
    wherein the power transmission circuit intermittently supplies the first AC power, and
    an intermittent cycle in which the power transmission circuit intermittently supplies the first AC power is longer than a cycle of the intermittent pattern.

* * * * *